(12) United States Patent
Fisher

(10) Patent No.: US 10,338,793 B2
(45) Date of Patent: Jul. 2, 2019

(54) MESSAGING WITH DRAWN GRAPHIC INPUT

(71) Applicant: Timothy Isaac Fisher, Austin, TX (US)

(72) Inventor: Timothy Isaac Fisher, Austin, TX (US)

( * ) Notice: Subject to any disclaimer, the term of this patent is extended or adjusted under 35 U.S.C. 154(b) by 362 days.

(21) Appl. No.: 14/696,098

(22) Filed: Apr. 24, 2015

(65) Prior Publication Data
US 2015/0309720 A1     Oct. 29, 2015

Related U.S. Application Data

(60) Provisional application No. 61/984,319, filed on Apr. 25, 2014.

(51) Int. Cl.
*G06F 3/0484* (2013.01)
*H04L 12/58* (2006.01)
*G06F 3/0488* (2013.01)

(52) U.S. Cl.
CPC ........ *G06F 3/04847* (2013.01); *G06F 3/0488* (2013.01); *H04L 51/08* (2013.01); *H04L 51/10* (2013.01)

(58) Field of Classification Search
CPC ............. G06F 3/04847; G06F 3/04842; G06F 3/04845; G06F 3/0485; H04L 51/08; H04L 51/10
See application file for complete search history.

(56) References Cited

U.S. PATENT DOCUMENTS

| | | | |
|---|---|---|---|
| 5,239,373 A | 8/1993 | Tang et al. | |
| 6,304,898 B1 | 10/2001 | Shiigi | |
| 6,542,165 B1 * | 4/2003 | Ohkado | G06F 3/0481 715/210 |
| 6,564,249 B2 | 5/2003 | Shiigi | |
| 6,687,876 B1 * | 2/2004 | Schilit | G06F 17/241 715/231 |
| 6,691,162 B1 | 2/2004 | Wick | |
| 6,727,916 B1 | 4/2004 | Ballard | |
| 6,779,178 B1 | 8/2004 | Lloyd et al. | |
| 6,798,907 B1 | 9/2004 | Clary et al. | |
| 6,826,551 B1 | 11/2004 | Clary et al. | |

(Continued)

OTHER PUBLICATIONS

Aaron Zinman and Judith Donath, "Signs: Increasing Expression and Clarity in Instant Messaging," 2009, IEEE, "Proceedings of the 42nf Hawaii International Conference on System Sciences," pp. 1-10.*

(Continued)

*Primary Examiner* — Dino Kujundzic

(74) *Attorney, Agent, or Firm* — Staas & Halsey LLP

(57) ABSTRACT

Messaging applications are enhanced with drawn images or words that appear on a communication device screen alongside messages. Users can express themselves more creatively as well as visually reference previously sent or received messages, such as by drawing an arrow to them or circling them. Graphic inputs are also operable to alter a sent message so as to convey additional or corrective meaning. By extending the drawing field outside the individual messages, this combination of messages and graphic inputs creates a third communication functionality not present in either messaging or drawing alone.

35 Claims, 14 Drawing Sheets

Graphics Mode

(56) References Cited

U.S. PATENT DOCUMENTS

| | | | |
|---|---|---|---|
| 7,003,308 B1 | 2/2006 | Fuoss et al. | |
| 7,224,991 B1 | 5/2007 | Fuoss et al. | |
| 7,370,269 B1* | 5/2008 | Prabhu | G06F 17/30873 715/201 |
| 7,372,470 B2 | 5/2008 | Kim et al. | |
| 7,373,590 B2* | 5/2008 | Woolf | G06F 17/242 715/230 |
| 7,516,183 B2 | 4/2009 | Shiigi | |
| 7,791,589 B2 | 9/2010 | Sawada | |
| 7,894,836 B1 | 2/2011 | Fuoss et al. | |
| 8,010,901 B1* | 8/2011 | Rogers | G06F 9/54 709/204 |
| 8,054,971 B2 | 11/2011 | Weiner | |
| 8,350,871 B2 | 1/2013 | Gyorfi et al. | |
| 8,441,514 B2 | 5/2013 | Won et al. | |
| 9,003,306 B2* | 4/2015 | Mehin | H04L 12/1827 715/758 |
| 2001/0049289 A1 | 12/2001 | Kim | |
| 2002/0078088 A1 | 6/2002 | Kuruoglu et al. | |
| 2002/0130904 A1* | 9/2002 | Becker | H04L 51/04 715/753 |
| 2002/0143994 A1 | 10/2002 | Sun et al. | |
| 2003/0163525 A1 | 8/2003 | Hendriks et al. | |
| 2004/0172595 A1* | 9/2004 | Lerner | G06F 3/04883 715/201 |
| 2005/0114791 A1 | 5/2005 | Bollenbacher et al. | |
| 2005/0183005 A1* | 8/2005 | Denoue | G06F 17/241 715/202 |
| 2005/0188016 A1* | 8/2005 | Vdaygiri | G06Q 10/10 709/205 |
| 2006/0010368 A1* | 1/2006 | Kashi | G06F 17/2247 715/205 |
| 2006/0031361 A1* | 2/2006 | Bailey | H04L 51/04 709/206 |
| 2007/0124387 A1 | 5/2007 | Galloway | |
| 2008/0079751 A1 | 4/2008 | Arrasvuori | |
| 2010/0325557 A1* | 12/2010 | Sibillo | G06F 3/0481 715/751 |
| 2011/0081926 A1 | 4/2011 | Monteiro et al. | |
| 2011/0319105 A1 | 12/2011 | Weiner | |
| 2013/0263251 A1 | 10/2013 | Fleizach et al. | |
| 2014/0047022 A1* | 2/2014 | Chan | G06F 17/241 709/204 |
| 2014/0052794 A1 | 2/2014 | Tucker et al. | |
| 2014/0329548 A1 | 11/2014 | Tharshanan et al. | |

OTHER PUBLICATIONS

Golovchinsky et al., "Moving Markup: Repositioning Freeform Annotations," 2002, UIST'02, Oct. 27-30, 2002, Paris, France, pp. 21-29. (Year: 2002).*

"Sun SharedShell Tool" video, created in 2000 and published on YouTube on Jun. 7, 2013, available at https://youtu.be/9llz-G14wjQ. (Year: 2000).*

International Preliminary Report on Patentability dated Apr. 11, 2016 in co-pending International Patent Application No. PCT/US2015/27644.

International Search Report and Written Opinion of the International Searching Authority dated Jul. 29, 2015 in co-pending International Patent Application No. PCT/US2015/027644.

Abitofcode, "Sketchshare—doodling between 3ipads", 2012. Retrieved from the Internet Jul. 8, 2015 <www.youtube.com/watch?v=ARyXKIjY378>, 2pp.

* cited by examiner

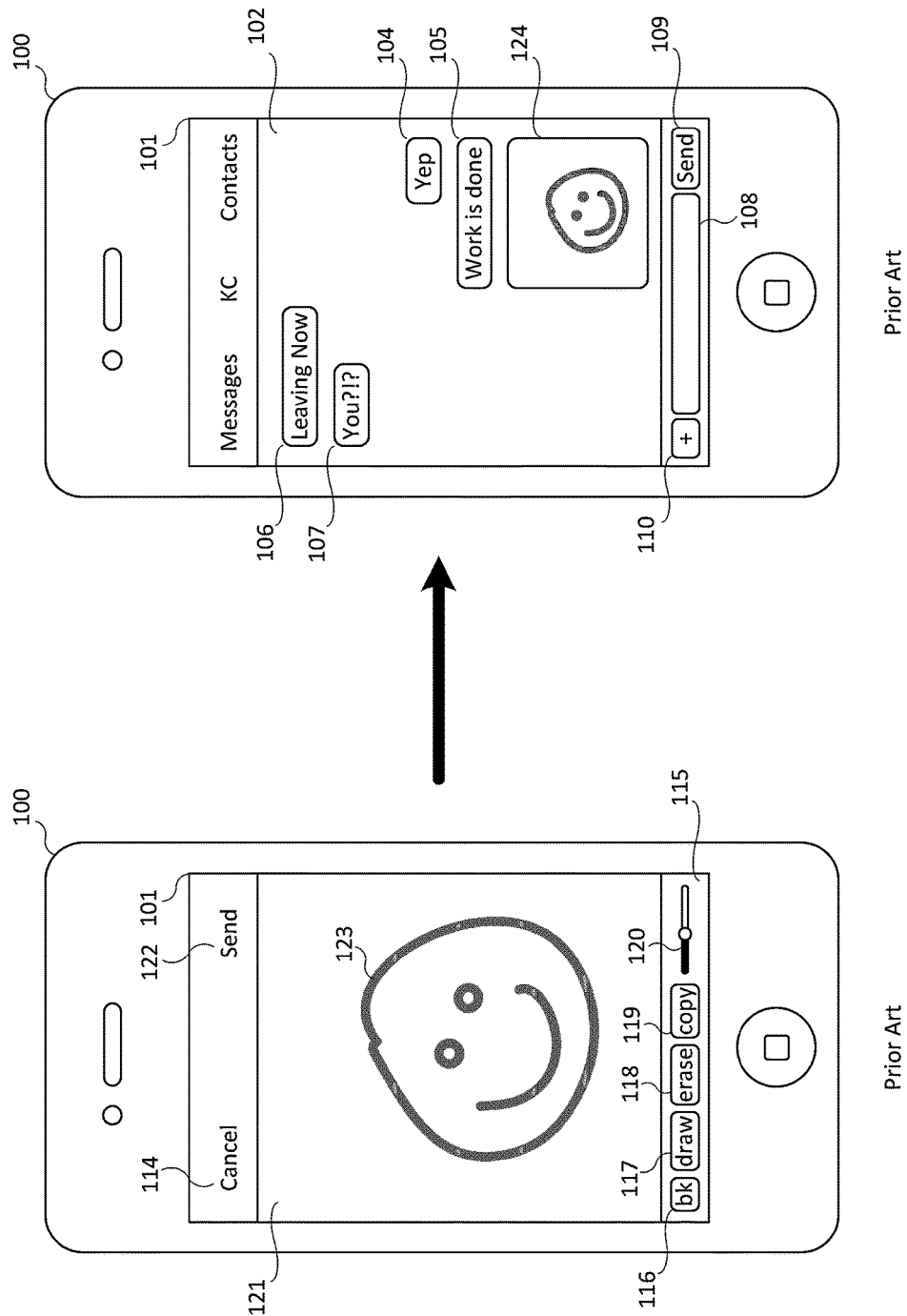

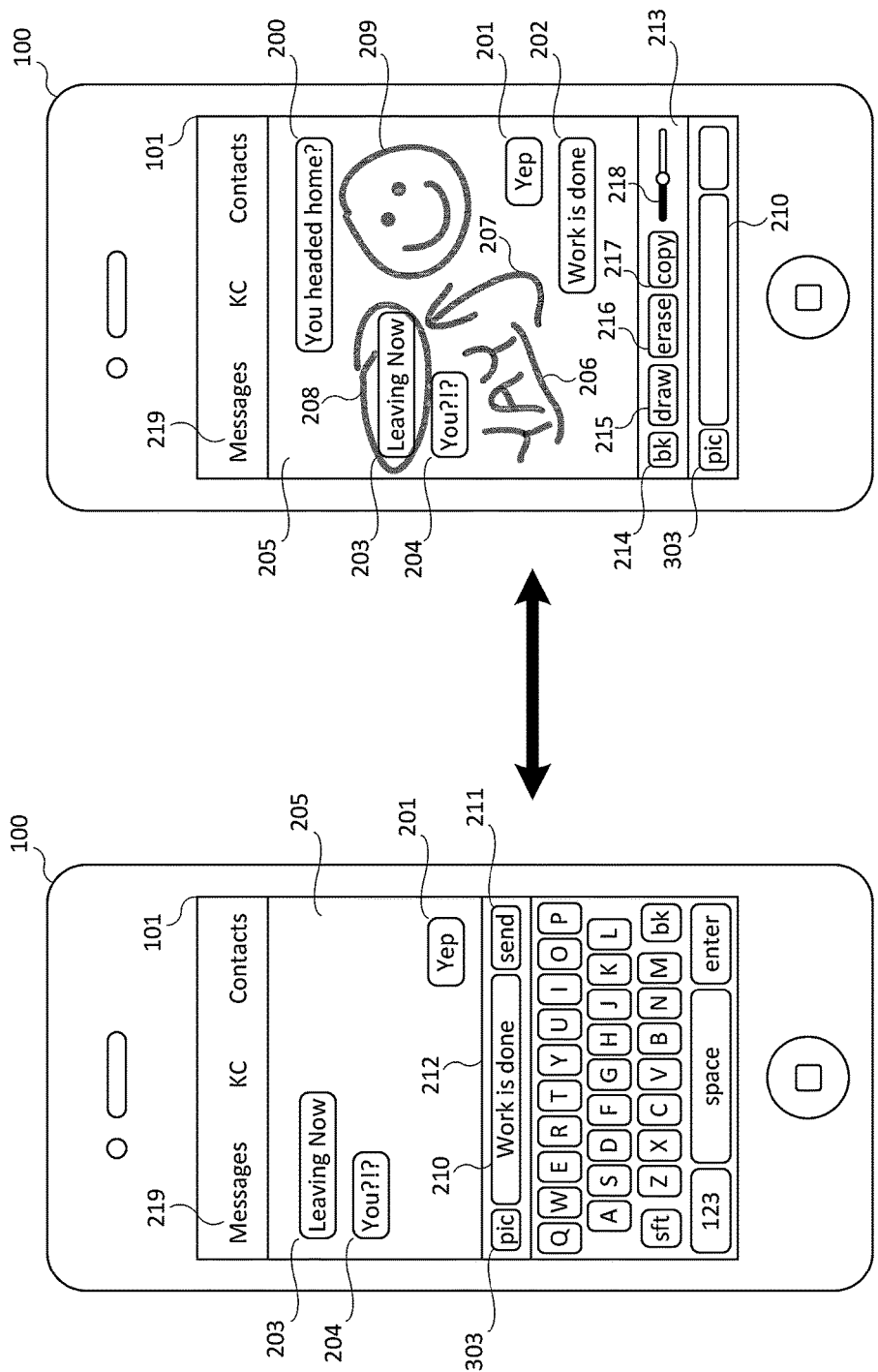

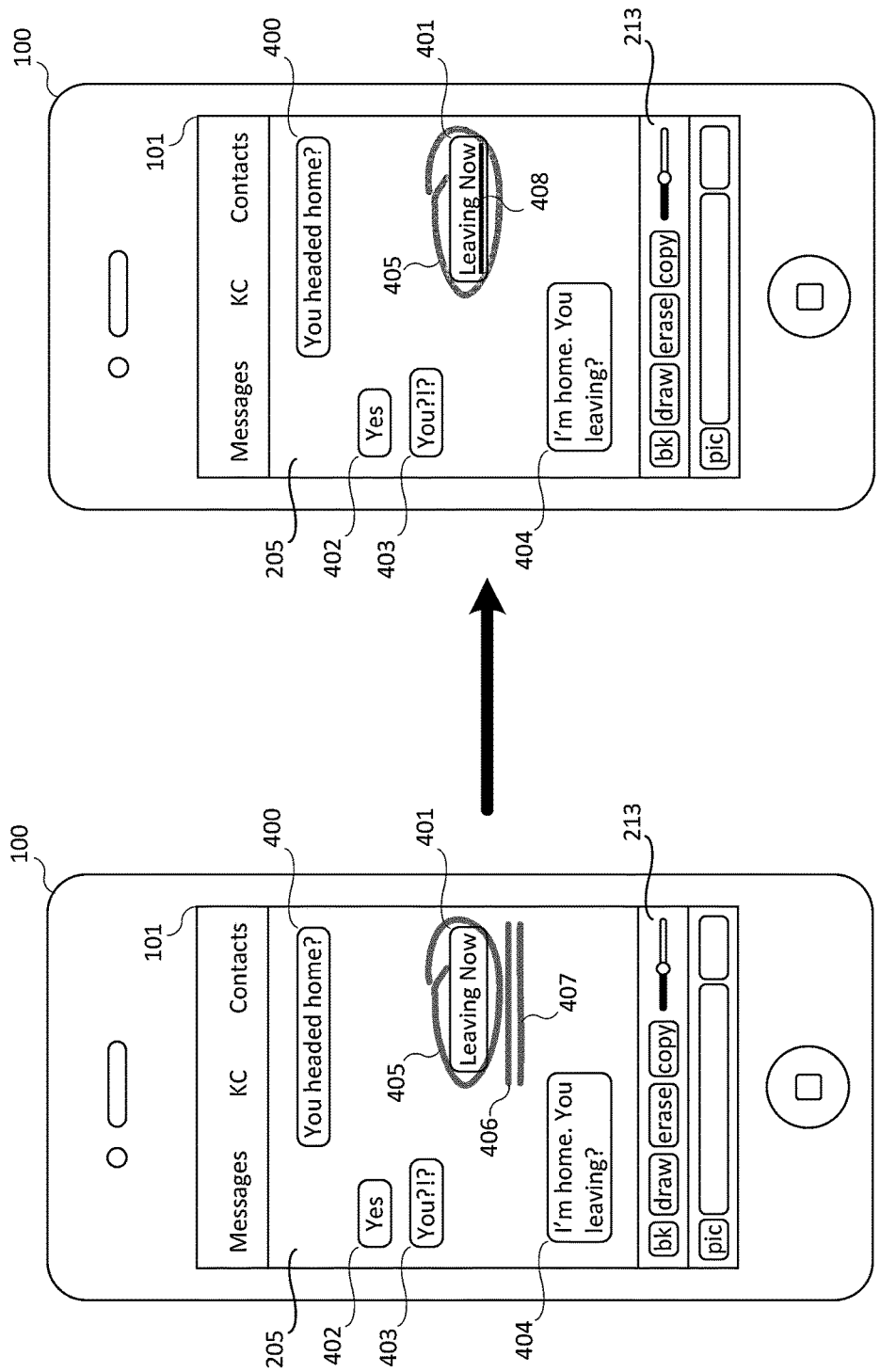

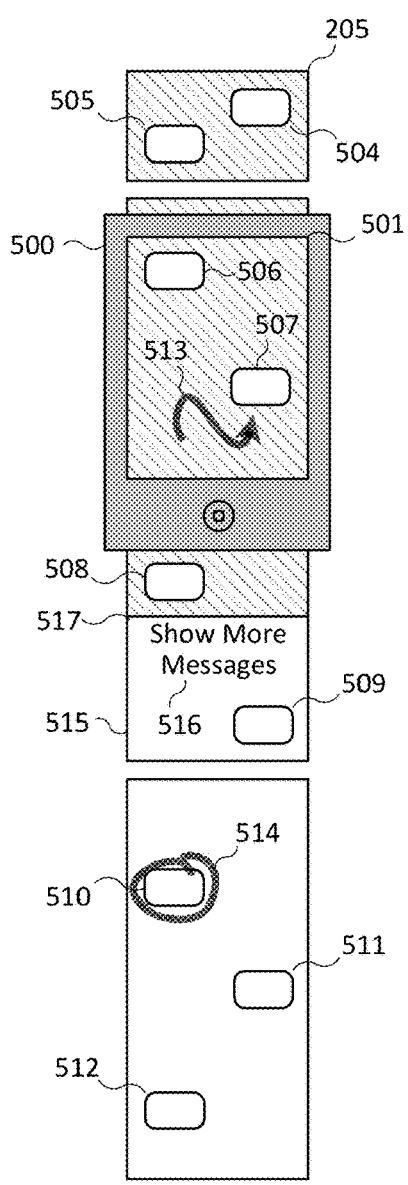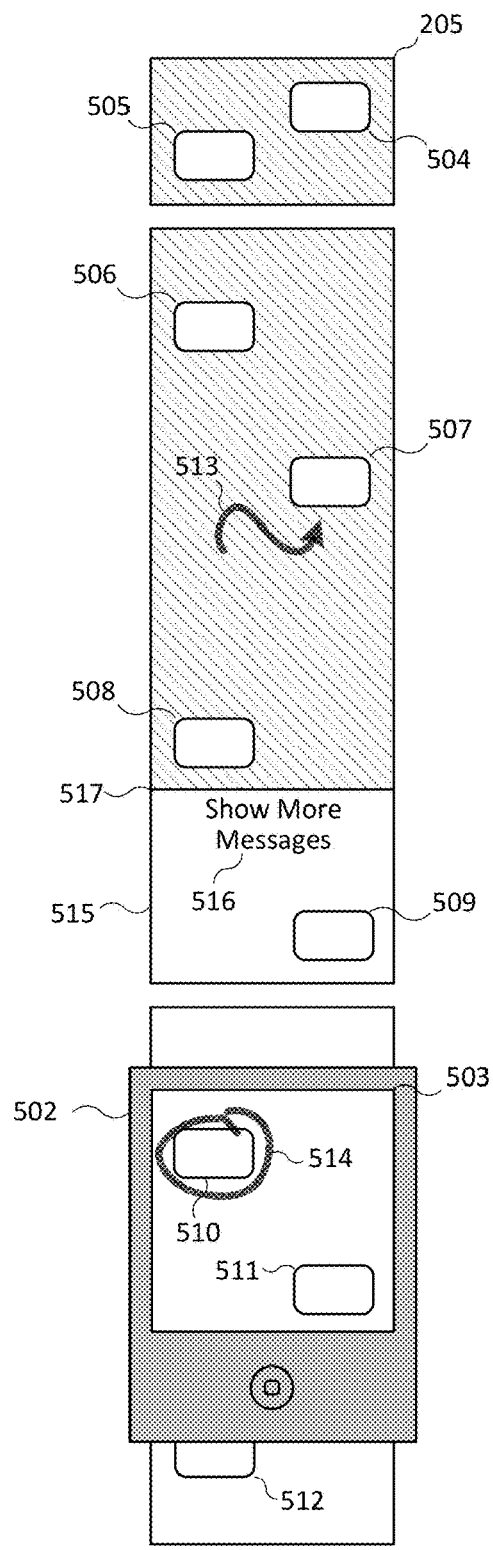
FIG. 5A
FIG. 5B

MESSAGING WITH DRAWN GRAPHIC INPUT

CROSS-REFERENCE TO RELATED APPLICATIONS

This application is related to and claims the benefit of U.S. provisional patent application entitled TEXT MESSAGING WITH HAND-DRAWN GRAPHIC INPUT, having Ser. No. 61/984,319 filed on Apr. 25, 2014 and incorporated by reference herein in its entirety.

BACKGROUND OF THE INVENTION

1. Field of the Invention

Described below are methods, devices, and systems for messaging applications that incorporate drawn or written graphic inputs.

2. Description of the Related Art

Messaging applications, such as text messaging or instant message, have grown very popular and are found today on millions of computers, cell phones, smart phones, tablets, and other communication devices worldwide. These applications send messages between communication devices, often using Short Message Service (SMS), Multimedia Message Service (MMS), or web-based data formats. Such messaging applications commonly include, but are not limited to: text messaging applications like Apple Messenger or Google Hangouts, or Instant Messaging applications like Facebook Messenger or Whatsapp. Many industrial messaging applications also exist to support particular industries, such as messaging between a doctor and patient, or tech support applications.

Despite this growing popularity and the technological advancement of modern communication devices, today's messaging applications limit users' creative potential and make messaging more difficult by not providing a simple and expressive way to send graphic inputs. Rather, today's technologies, if they provide a way to send graphic inputs at all, require multiple steps to send a graphic input and confine the graphic input to a single message unit, such as a message bubble, that cannot interact with previously sent messages or be significantly altered after it is sent.

Originally, messaging applications required users to open each individual message separately, such as on a pager or feature phone. As such, it was natural that each message was treated as its own unit of communication separated from previously sent messages. More advanced technologies now display multiple messages simultaneously and in chronological order in a scrollable environment. However, whether the message consists of text, a picture, a graphic input or drawing, a video, a gif, a voice message, or other forms of communication, today's technologies continue to treat each message as a single unit of information that is separated from previous messages, and when sent is displayed at the end of a chronological list of messages. This paradigm does not allow graphic inputs to exist outside the physical message unit, such as a message bubble, or to exist outside the chronological flow of the conversation. Messages are both physically separated as well as time-bound.

As such, today's messaging applications do not provide a way to graphically reference previously sent messages, such as by using graphic inputs to circle or point to messages displayed in a conversation. Rather, users must send a follow-up message which is appended to the end of a conversation. Especially when describing a previously sent message, switching conversation topics, or discussing multiple conversation topics simultaneously, this method of reference can create confusion and necessitate longer follow-up explanations. If a message is a picture message, no method exists to annotate that picture with graphic inputs after it is sent, except by resending a copy of the picture with annotation as a new message. Furthermore, no method exists to graphically connect two messages to provide additional information about the relationship between messages.

Today's messaging applications also do not provide a way for users to easily collaboratively communicate graphic inputs or to communicate graphic inputs in real-time, as graphic inputs must be composed, sent and displayed as separate picture messages that may not be altered. In addition, sending drawings or graphic inputs today requires performing a time consuming, multi-step process.

Significant programmatic constraints are encountered when solving the above-mentioned problem and can be technologically complicated to implement.

Thus, a need in the art exists for an enhanced messaging system that is easier to use and that more fully captures the creativity and complexity of human communication.

SUMMARY OF THE INVENTION

Messaging applications are enhanced with drawn images or words that appear on a communication device screen alongside messages, such as text messages, picture messages, video messages, gifs, voice messages, etc. Users can express themselves more creatively as well as visually reference other messages with graphic inputs, such as by drawing an arrow to them or circling them. Furthermore, the ability to add graphic inputs to any part of the messaging conversation enables quick and efficient communication of drawings and annotations without requiring users to perform a multi-step process to send a graphic input. Graphic inputs are also operable to alter a sent message so as to convey additional or corrective meaning. By extending the drawing field outside the individual messages, this combination of messages and graphic inputs creates a third communication functionality not present in either messaging or drawing alone.

Today's messaging applications do not consider two important constraints needed to provide this third functionality and enable the method described below. First, the relative position between messages and drawings should be held constant, or, for example, a graphic input that pointed to a particular message on a sender's communication device screen might not point to the same message when displayed on a receiver's communication device. Second, the relative position of the elements within a message and the message itself should be held constant or, for example, a graphic input that pointed to a particular element on a sender's device might not point to the same element on a receiver's device. Such elements might include the words in a text message or an element of an image in a picture message.

In addition, if two users communicate with each other using a messaging application that incorporates graphic inputs, it is desirable for the first user's messages to appear on the right side of both device's screens, while the second user's messages appear on the left side of both screens, or vice versa. As such, a user's messages may appear on the right side of his screen in some conversations, while appearing on the left side in other conversations. This layout represents a significant departure from today's messaging applications, which render a user's messages on the same side of his own device screen regardless of conversation.

Described below are a system and methods for incorporating handwritten graphic inputs into messaging applications on electronic communication devices, such as personal digital assistants, pagers, smart phones, mobile tablets, and desktop or laptop computers. Methods of manually entering a graphic input may include a touch screen, a stylus, tracked eye movements, such as with smart glasses, tracked hand movements in free space, a mouse or joystick, voice commands, a keyboard, a trackball, and other input/output devices. Graphic inputs may also be drawn by a computing device, rather than a person, operable to programmatically interact with an exemplary messaging application.

An exemplary embodiment provides a scrolling environment, called a conversation field, on which graphic inputs are displayed alongside messages, such as text messages, picture messages, or voice messages, that may be displayed within message bubbles. Graphic inputs are not confined within the message bubbles, but can be drawn on the conversation field itself, thereby allowing users to associate a graphic input with messages displayed in a conversation, such as by drawing a circle around a message or drawing an arrow that points to a particular element of a message.

The method also uses graphic inputs to alter sent messages. If the message is a text message, the style (font, color, size, etc.) of the messages may be altered to convey additional or corrective meaning. For example, circling a text message and underlining the circle causes the exemplary messaging application to underline the text in that message. A user may also use graphic inputs to annotate individual characters in a message whereby the annotation alters the data content of a character. For example, a line across an 'l' may change the 'l' to a 't', or a stroke in a Chinese character may change the character from one encoded character to a different encoded character. If the message is a picture message, the exemplary messaging application may provide tools that are operable to alter the picture itself, such as erasing parts of the image, translating all or part of the image, mixing graphic inputs with the picture, or changing the image's attributes, such as hue or brightness.

An exemplary embodiment may include graphic tools, such as various pen sizes, spray paints, color pallets, including translucent colors, as well as predefined shapes and symbols, to enhance the drawing experience. Especially when multiple users communicate in the same messaging conversation, such as when using group chat, a users' messages and graphic inputs may be similarly colored to aid in associating graphic inputs with their author. For example, a first user's graphic inputs and messages are displayed in a shade of blue while a second user's graphic inputs and messages are displayed in a shade of red. Users may modify the graphic inputs they entered, such as by erasing, and in some embodiments may modify the graphic inputs of other users.

An exemplary messaging application uses communication networks, such as the internet, cellular networks, or point-to-point networks, to send messages and graphic inputs to other communication devices. Graphic inputs may be transmitted in real-time such that a receiver can see a sender's graphic inputs as a sender enters them. In other embodiments, a user may enter a graphic input and then execute a submit command, such as pushing a send button, to send graphic inputs, or a messaging application may determine how and when to send graphic inputs. An exemplary messaging application may send messages to communication devices operating messaging applications that do not provide for graphic inputs, and may save an image representation of graphic inputs for sending to a client that does not have the application.

BRIEF DESCRIPTION OF THE DRAWINGS

These and other aspects and advantages will become more apparent and more readily appreciated from the following description of the exemplary embodiments, taken in conjunction with the accompanying drawings of which:

FIGS. 1A-1E are plan views of a smartphone display illustrating a known messaging application.

FIG. 2A is a plan view of a smartphone illustrating an exemplary user interface in keyboard mode before hand-drawn graphic input;

FIG. 2B is a plan view of a smartphone illustrating an exemplary user interface in graphics mode after hand-drawn graphic input;

FIG. 4A is a plan view of a smartphone illustrating an embodiment that uses graphic input to alter messages;

FIG. 4B is a plan view of a smartphone after alteration of a message;

FIGS. 5A and 5B are plan views of a programmatic environment operable to maintain the alignment of messages and graphic inputs displayed on different communication devices;

DETAILED DESCRIPTION OF THE PREFERRED EMBODIMENTS

Figure 1B:
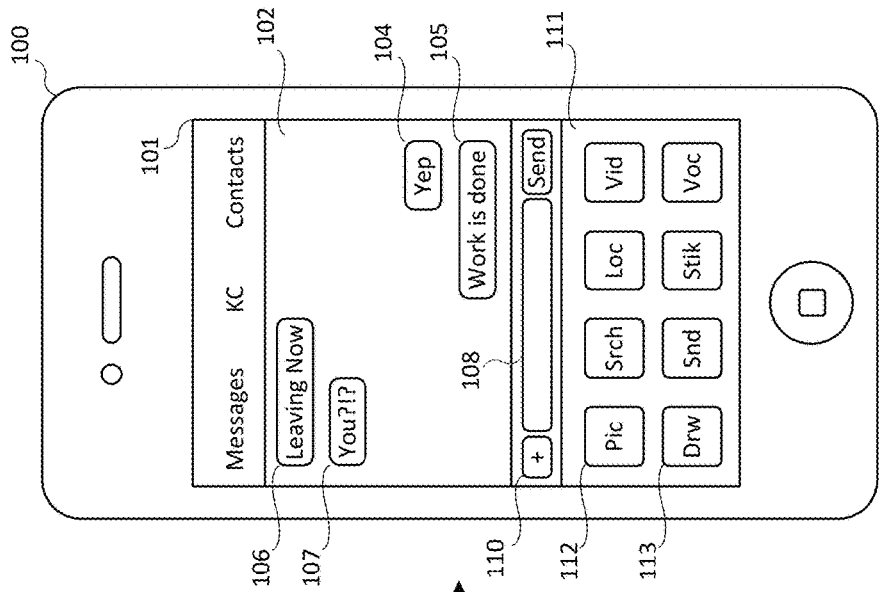

Reference will now be made in detail to the preferred embodiments, examples of which are illustrated in the accompanying drawings, wherein like reference numerals refer to like elements throughout.

FIGS. 1A-1E are plan views of a smartphone 100 illustrating a known messaging application, such as MessageMe.

The communication device 100 shown here is that of a first user (USER A). A second user (USER B) is assumed to use a communication device (not shown) with a messaging application that displays the messaging conversation. USER A sent messages 103, 104, and 105 appearing on the right side of touchscreen 101 within a scrollable field 102 of messages. USER B sent messages 106 and 107 appearing on the left side of touchscreen 101. The conversation proceeds chronologically from the top to the bottom of the screen, such that message 103 is first, followed by 106 and 107, then 104 and 105. Field 108 is a text field into which the user types text-based messages (such as 103, 104, 105, etc.) which are sent when the user pushes the send button 109.

Figure 1A:
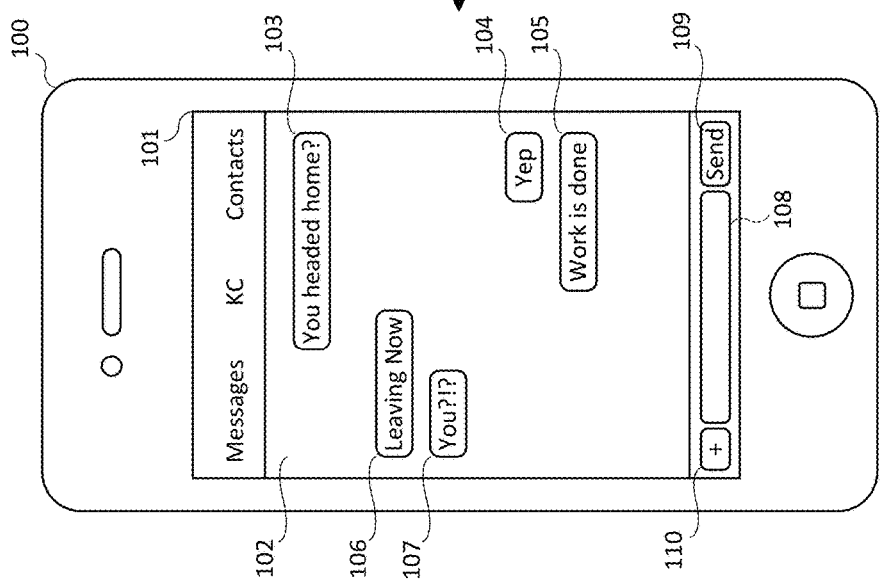

When USER A desires to send a graphic input, he starts by pushing button 110 in FIG. 1A. The known application responds as illustrated in FIG. 1B by revealing a window 111 that contains a plurality of buttons (112, 113, etc.) from which the user can select a type of non-text-based message. USER A can choose to send a picture message (button 112 labeled: "Pic"), a search menu (labeled: "Srch"), a location share (labeled: "Loc"), a video message (labeled: "Vid"), a voice message (labeled: "Voc"), a sticker message (labeled "Stik"), a sound or music message (labeled: "Snd"), or a drawing or graphic input message (button 113 labeled: "Drw").

When USER A pushes the draw button 113 in FIG. 1B, the known program responds as illustrated in FIG. 1O by displaying a simple drawing program within a window that fills touchscreen 101. The window contains a cancel button 114 that when pushed closes the drawing window and returns the user to the previous screen illustrated in FIG. 1B. The window also contains a drawing toolbar 115 with an undo button 116, a draw button 117, an erase button 118, a copy button 119, and a slider 120 to adjust the size of drawn lines. More or fewer drawing tools may be provided. The user may draw anywhere on the screen in the area 121 between the top menu (that contains the cancel button 114 and the send button 122) and the drawing toolbar 115 by touching the screen with a finger or stylus. As illustrated, USER A composed graphic input 123: a smiley face consisting of a head, two eyes, and a mouth.

When USER A finishes composing graphic input 123, he pushes the send button 122. The program responds as illustrated in FIG. 1D by sending the graphic input 123 as a picture message 124, which USER B receives.

Figure 1E:
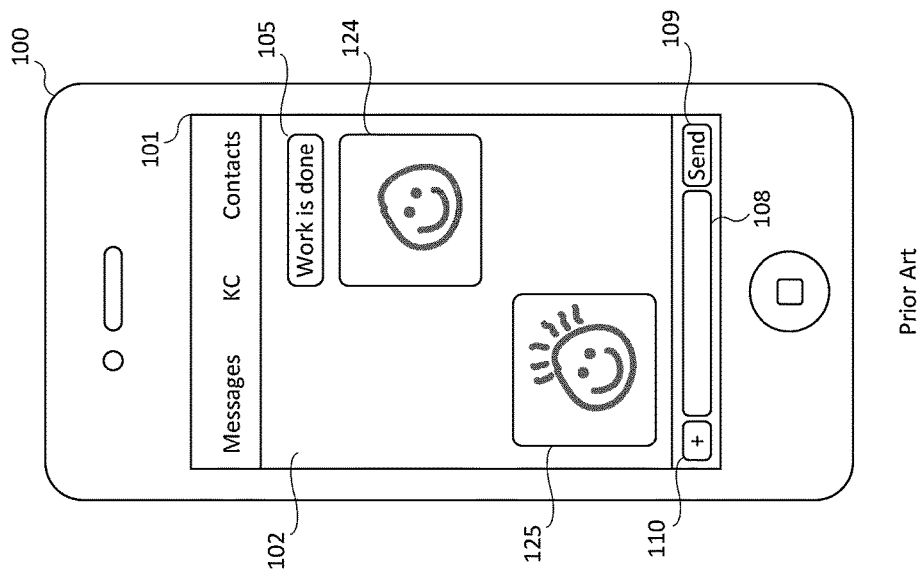

While USER B cannot alter message 124, he may save a copy of message 124, alter the copy, and then send the copy as a new picture message, as illustrated by message 125 in FIG. 1E, such that both message 124 and the altered copy 125 will be simultaneously displayed as separate picture messages within the scrollable conversation field 102. As illustrated, USER B copied USER A's message 124 and added 'hair' drawings to the smiley face as seen in message 125. The process could continue indefinitely; either user could save a copy of picture 125, modify it again, and send the modified copy such that three picture messages would be displayed, etc.

It should also be noted that some known applications allow users to annotate and send pictures in a similar fashion. For example, if the user selects the picture button 112 in FIG. 1B, the known application first brings the user to a picture picker application that displays images from the communication device's memory. When the user picks a picture to send, the application then displays a separate drawing window similar to that illustrated in FIG. 1O, except that the selected picture becomes the background of the drawing enabled area 121 so the user can annotate the picture before sending. When the user sends the picture, the known application saves the selected picture with annotations as a new image and sends the new image as a picture message to be displayed in similar fashion as the picture message 124 illustrated in FIG. 1D. The receiving user may save a copy of the annotated picture message, add additional annotations, and send it back to the first user. The known application would then display two picture messages: (1) one with the original annotated picture from the first user, and (2) a second picture messages containing the original annotated picture with the second user's annotations.

As illustrated in FIGS. 1A-1E, sending graphic input on a known application, such as MessageMe that contains a built-in graphic input feature, requires at least 4 steps: (1) push the picture button 110 in FIG. 1A, (2) push the draw button 113 in FIG. 1B, (3) draw the graphic input 123 in FIG. 1O, and (4) push the send button 122 in FIG. 1O. The result of this lengthy process, is a static picture message, potentially confined within a message bubble, as illustrated by message 124 in FIG. 1D.

On a messaging application such as Apple's iMessage, which does not provide a built-in graphic input feature, a user may be required to perform a dozen or more steps to send a graphic input. Users may be required to leave their texting application, compose a graphic input in a separate drawing application such as DrawCast, save the graphic input to the memory of their communication device, reenter their message application, and then retrieve the graphic input from their device's memory so it can be sent as a picture message. To avoid this complicated process and the necessity of downloading and installing a separate drawing application, it is not uncommon for people today to send hand drawn graphics by: (1) first drawing an images on a physical white board or a piece of paper, then (2) photographing the piece of paper and saving the photograph to their device's memory, then (3) leaving their camera app and reentering their messaging application, then (4) retrieving the photograph of the drawing from their communication device's memory, and finally (5) sending the photograph as a picture message. The result of either process is a static picture message, potentially confined within a message bubble, as illustrated by message 124 in FIG. 1D.

It should be noted that on USER B's device (not shown), messages may be displayed in a completely different way than on USER A's device. If USER B uses a different messaging application than USER A, then USER B's messaging application may display messages with a different font, a different font size, or with different line spacing, thereby resulting in different word wrap positions and message sizes. USER B's application may also use different shaped message bubbles or use a different amount of spacing between messages. USER B's application may also display messages of different types in completely different ways; for example, a picture message on USER B's application may be displayed in a small message bubble while on USER A's device the same picture is displayed across the entire conversation field. Furthermore, even if USER B uses the same messaging application as USER A, if USER B uses a different device with a different size screen than USER A, the separation between messages on the right and left sides of the screen could be drastically different between devices. Finally, even if USER A and USER B use the same device type running the same messaging application, nearly all major messaging applications in commercial existence today display a user's messages on the right side of his own screen, such that messages 103, 104, 105, and 124 displayed on the right side of USER A's device 100 would be displayed on the left side of USER B's device, while messages 106, 107, and 125 displayed on the left side of USER A's device 100 would be displayed on the right side of USER B's device. As such, a significant challenge exists in creating a device of the exemplary type that combines messaging with graphic inputs and maintains the alignment of the graphic inputs with messages in the conversation on a plurality of device types. Simply adding graphic inputs to a prior-art application would not provide the benefits of the exemplary application, and no evidence exists that any prior art messaging applications have taken steps to disclose or solve these challenges.

FIG. 2A is a plan view of a smartphone 100 illustrating an exemplary user interface of an application in keyboard mode before entering graphic inputs; and FIG. 2B is a plan view of the smartphone 100 illustrating an exemplary user interface of the application in graphics mode after entering graphic inputs. The communication device 100 shown here is that of a first user (USER A). A second user (USER B) is assumed to use a communication device (not shown) with a messaging application that displays the messaging conversation and graphic inputs. USER A sent messages 200, 201, and 202 appearing on the right side of touchscreen 101 within a scrollable field 205 of messages (called the conversation field). USER B sent messages 203 and 204 appearing on the left side of touchscreen 101 within the scrollable field 205 of messages. The conversation proceeds chronologically from the top to the bottom of the screen, such that message 200 is first, followed by 203 and 204, then 201 and 202.

As illustrated in FIG. 2B, USER A has entered graphic inputs 206, 207, and 208 using the communication device's touchscreen; these graphic inputs are received by USER A's communication device in association with messages in the conversation and appear on USER B's communication device as well with like association between the graphic inputs and messages. USER A expressed excitement over USER B's leaving work, as indicated by USER B in message 203, by: entering graphic input 206 (the word "Yay" underlined), drawing an arrow 207, and circling 208 USER B's message 203. USER B responded by entering graphic input 209, a smiley face consisting of a head, two eyes and a smile, on her device. As illustrated, graphic input 209 appears on USER A's device. Back and forth communication entirely through drawing may occur, and users might even play games, such as tic-tac-toe or other games, with each other. While not illustrated, users may enter graphic inputs over another user's graphic inputs.

While in keyboard mode, as illustrated in FIG. 2A, the user can type a message using the keyboard, with the message appearing in the text field 210 as it's typed. When the user touches the send button 211 the message is sent to USER B and appears on the conversation field 205 within a message bubble (see corresponding message 202 in FIG. 1B).

While in keyboard mode, users can copy the content of the individual messages displayed in the conversation field to the memory of their communication device for saving or pasting at a later time. For example, the user may copy the string content of a text message or save a received image from a picture message to his device's photo library.

To transition from keyboard mode to graphics mode, a user places a finger or stylus at the top of the keyboard area 212 and slides it down across the screen, causing the keyboard to hide out of view. As the keyboard transitions out of view, a graphics mode drawing toolbar 213 appears as illustrated in FIG. 2B. The drawing toolbar is shown here with an undo button 214, a draw button 215, an erase button 216, a copy button 217, and a slider 218 that increases or decreases the size of the drawing pen or eraser. Tapping the text field 210 while in graphics mode brings the keyboard back into view and transitions the messaging application from graphics mode to keyboard mode. In an alternative embodiment the transition between keyboard mode and graphics mode may be handled by a single button without removing the keyboard from the screen, or graphic inputs may be entered onto the screen while the keyboard is in view or hidden.

Pressing the draw button 215 allows a user to enter graphic inputs using an input device, such as touchscreen 101, with the communication device receiving the graphic input in association with at least one message The user may draw anywhere on touchscreen 101 in the area between the top menu (that contains the 'Messages' button 219 and the "Contacts" button) and the drawing toolbar 213 by touching the screen with a finger or stylus. The graphic inputs shown here are translucent, and correspond with the color of a user's message bubbles, helping users associate drawings with their author. In other embodiments, any color might be chosen for a user's drawings, and other features not shown could be provided, such as methods to change pen colors, line styles, opacity, etc.

The exemplary application may also provide the user with ways to add predefined shapes, symbols, or images to the conversation. For example, the exemplary application may provide ISO certified medical symbols for use in the medical industry that appear on the screen wherever the user places his finger or other input device. Sticker messages, as should be readily understood by a person knowledgeable in the art, may also be provided, but unlike stickers in known applications, the exemplary application allows stickers to be placed anywhere on the conversation, and may allow the user to stack, translate, or alter the sticker images on the screen.

Each time the undo button 214 is pressed, the messaging application removes the last graphic element that was entered on the screen. As an example, the smiley face 209 was entered as four graphic elements, a circle, a smile, and two eyes; while graphic input 206 (the word "Yay" underlined) is clearly composed of seven graphic elements.

The exemplary embodiment transmits a user's drawings in real-time such that a receiving user can see a sender's graphic input as the sender draws it. The embodiment may also provide a button (not shown) that enables the user to record the creation of a graphic input so that it can be replayed for the user in the manner in which it was drawn. The messaging application may also provide a button (not shown) that allows a user to replay graphic inputs in an animated fashion. Replaying graphic inputs can help a user determine the order in which the graphic inputs were originally drawn. In another embodiment, users press a send button (not shown) to send a graphic input, and may erase all or part of what they are preparing to send before executing the send command. In such an embodiment, the messaging application may display the received graphic input all at once, in parts, or may animate the graphic input, such as by displaying the graphic input as if it were being drawn dynamically.

Pressing the erase button 216 allows users to erase graphic inputs displayed in the conversation by touching the touchscreen in the location the corresponds with the graphic input the user desires to erase. The exemplary messaging application allows users to erase only their own graphic inputs. In an alternative embodiments, users may erase the graphic inputs that they receive from other users. Pressing the copy button 215 allows users to copy graphic inputs to their communication device's memory.

When users press the messages button 219, the exemplary application displays a list of contacts with whom the user has a conversation. Users may select an existing conversation or start a new conversation by entering the contact information of the person with whom they would like to communicate. The exemplary messaging application interfaces with a contact list in the memory of the communication device, and may interface with a contact list on an external database, such as might be hosted on a server network. The contact list may be displayed using a table view controller, as should readily be understood by a person knowledgeable in the art.

While only two users are a party to the illustrated conversation, it should be understand that a plurality of users may be part of the conversation. It is also possible that only one user is a party to the conversation. Furthermore, it is possible that only one user can modify the conversation, such as in a 'public chat' forum, whereby the owner of the conversation can add messages and drawings that are visible to the public or some select group of people who cannot modify the conversation. It is also imaginable that one or more parties to the conversation is a computer device rather than a person. Such a computer device may dynamically or intelligently add messages or graphic inputs to the conversation, or may add graphic inputs in a predefined sequence. In yet another embodiment, it is imaginable that only select parties to the conversation may control when graphic inputs are enabled or disabled. For instance, in a tech support chat application, the user providing technical support may enable or disable the graphic input feature for all users at his own discretion.

The exemplary messaging application allows users to extend the empty space at the bottom of the conversation field to create added space for entering graphic inputs. The messaging application allows users to "pull" up more white space by swiping up on the scrollable conversation field with an input device when at the bottom of the conversation field. In an alternative embodiment, a button may be provided to activate more white space. The exemplary messaging application may also allow users to increase the distance between displayed messages so as to create more space for entering graphing inputs. For example, in one embodiment, a user may increase the separation between messages by placing two fingers close together on a communication device screen and then spreading those fingers apart in the vertical direction across the screen. A user may also decrease the separation between messages or remove empty space at the end of a conversation by pinching two fingers together on a communication device screen. The messaging application may determine the maximum or minimum separation allowable between messages.

A method may also be provided that allows users to see a time stamp associated with each message as well as graphic inputs so as to indicate the time that messages or graphic inputs were sent or received. The exemplary messaging application may associate a plurality of graphic element with a single timestamp.

Figure 3:
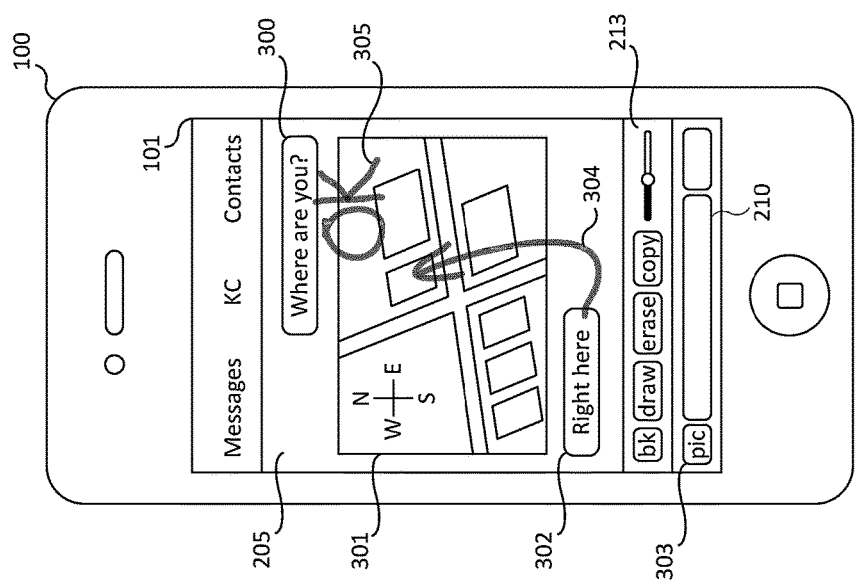
FIG. 3 is a plan view of a smartphone illustrating an exemplary user interface that is operable to send picture messages.

FIG. 3 is a plan view of a smartphone 100 illustrating an exemplary user interface of an application that can send picture messages. USER A sent messages 301 and 302 appearing on the left side of touchscreen 101. USER B sent message 300 appearing on the right side of touchscreen 101. Pushing the picture button 303 allows users to select an image, such as a photo or picture, from the communication device's memory, an external memory source, the internet, a camera, etc., and send it to a receiver. As illustrated, USER A responded to USER B's question "Where are you?" in message 300 by sending a picture of a map 301, sending text message 302, and then adding graphic input 304 to indicate his current position on the map, with those messages and graphic inputs appearing on USER B's device. USER B responded by sending graphic input 305, the handwritten word "OK". It should be noted that the exemplary application allowed both users to annotate the same picture message 301 at different times without sending a separate copy of the image, as discussed with reference to known applications in to FIGS. 1A-1E. To relay additional information, either user could continue to add or remove graphic inputs.

Unlike many previous messaging applications, the exemplary messaging application displays picture message 301 across the entire conversation field 205 rather than rendering it inside a message bubble (see FIG. 1D, message 124). By rending the picture across the entire screen, the exemplary messaging application makes it easier for users to annotate the picture with graphic inputs. To help associate a picture message with its author, the exemplary application may outline the picture with a color associated with the author's graphic inputs or messages. The exemplary application may also place the user's name or a unique identifier identifying the user within some proximity of the picture message.

It should be noted that in another embodiment, users may reposition the image on the conversation field, draw on it, or erase all or part of it. A zoom feature may also be provided, and users may enter graphic inputs while zoomed. Other tools may be provided that allow the user to translate all or part of the image, or alter other attributes of the image such as its contrast or brightness.

Users may save received images to the memory of their communication device. Images may also be sent within a message bubble, such as by pasting the image into the text field 210 or, in an alternative embodiment, using the picture button 303 while in keyboard mode.

FIG. 3 also illustrates a particular advantage of the exemplary embodiment over the known application illustrated in FIGS. 1A-1E, that is the ability to connect messages using graphic inputs. In this case, USER A graphically connected message 302 "Right here" with an element of message 301 in order to show his current location. This ability is not possible using known applications. Using a known application, USER A would be limited to annotating just the image before sending it, resulting in a static annotated image that could not be altered after sending and that required multiple time-consuming steps to produce, as discussed with reference to FIGS. 1A-1E. Using a known application, USER A could also have sent a picture of the map 301 without annotation, and then written an explanation in message 302 such as: "I'm in the West-most building on the North East side of the intersection". Such an explanation is more complicated than using the exemplary application, can become much more complicated when more intricate pictures are involved, and can result in significant miscommunications if one user's written description is interpreted with a different meaning by another user.

While the exemplary application demonstrates the use of the technology in a consumer application on a mobile device, the technology has similar uses in many commercial settings, such as, but not limited to, a tele-medicine application that helps doctors and patients communicate remotely via a chat service. For example, a doctor may wish to send a picture of a human anatomy to a patient and ask the patient to respond by adding graphic annotations to the picture to indicate on what part of the body the patient feels pain. Without the exemplary technology, it may be prohibitively complicated to ask a patient, especially an elderly patient, to save a copy of an anatomy picture, annotate the copy, save the annotated copy, and send the annotated copy back to the doctor, at which point the doctor would perform similar steps to send the anatomy picture with further annotations back to the client, such that two picture messages would be displayed, as similarly described with reference to FIGS. 1A-1E. However, with the exemplary technology, and as similarly described with reference to FIG. 3, a doctor could send a picture of an anatomy and simply ask a patient to touch their communication device screen on the part of the displayed anatomy picture associated with the location on the anatomy where they feel pain, thereby adding a graphic input to the anatomy picture. The doctor, without any additional steps, could add further graphic inputs to ask about pain in other areas, or could type short messages such as "But do you hurt here?", and then connect that message to an element in the anatomy picture. Such a method is much less prone to misunderstanding than describing in words a particular spot in the anatomy picture without a graphical way to logically connect the written description with an element in the picture.

Similar applications of the exemplary technology are imagined for an interior designer, an engineer, an educator teaching mathematics remotely, a construction foreman describing the location of a piece of equipment, or in any other situation where efficient and accurate transmission of information is desired.

It should be noted that in an alternative embodiment, an application can be imagined that allows a user to add graphic inputs only within a defined space of the conversation or scrollable environment, such as within the boundaries of a message displayed in the conversation. For example, an application may allow the user to add graphic inputs only in the square boundary of picture message 301. In such an embodiments, the application may send entered graphic inputs in real-time, or may allow a receiver's communication device to receive and render the added graphic inputs without resending or re-displaying a copy of the message with graphic inputs added as described with reference to FIGS. 1A-1E. It is also imaginable that such an application could allow a user to select a message that has been sent, such as picture message 301, then display the picture message in a separate view, perhaps similar to the simple drawing program described in FIG. 10, and then allow a user to annotate the picture, whereby the annotations with picture are rendered on the receiving device, possibly in real-time, without resending or displaying the picture with annotations again as a separate copy, as is described with reference to FIGS. 1A-1E. It should be understood that such and similar methods fall within the spirit of the herein disclosed exemplary application.

FIG. 4A is a plan view of a smartphone 100 illustrating an exemplary user interface of an application that uses graphic inputs to alter message, such as by altering a message style, content or meaning; and FIG. 4B is a plan view of the smartphone 100 after alteration of the message. USER A sent messages 400 and 401 appearing on the right side of touchscreen 101. USER B sent messages 402, 403, and 404 appearing on the left side of touchscreen 101.

As illustrated, USER B re-asks a question ("You leaving?") in message 404 that USER A has already answered in message 401. In response, USER A used graphic inputs to circle 405 message 401 and draw two lines 406 and 407 under the circle, causing the exemplary messaging application to underline the text of message 401 with a blinking underline 408. The texting application recognized USER A's intention to underline the text, and automatically removed graphic inputs 406 and 407.

The application logic required to recognize a user's intention to alter messages using graphic inputs may reside on a user's communication device, on a remote server, in the cloud, etc. In this embodiment, a controller on a client's communication device uses recognition software to identify and translate the drawn circle 405 with two lines 406 and 407 into an executable command. Both the sender's and receiver's devices perform like operations on the drawn graphic inputs, resulting in the blinking underline on both USER A's and USER B's device.

A variety of other graphic inputs may be used to interact with messages and cause the text of the messages to become italic, a larger font, a different color, or other style or content changes that may include animated graphics, such as a flashing underline, growing and shrinking letter(s), bolding and un-bolding word(s), etc. A user may also use graphic inputs to annotate individual characters in a message whereby the annotation alters the data content of a word or character. For example, a user may cross out a word in a message, and the application may recognize the user's intention and remove the word from the message. A user may also alter individual characters in a message. Adding a horizontal line across an 'l' may change the 'l' to a 't' by changing the encoding such that ASCII108 becomes ASCII116. In another language, a Chinese character may change from one encoded character to a different encoded character. For example, the addition of two graphic inputs representing strokes to the top of the character 'zi4' meaning 'a letter or symbol' may change the character 'zi4' to the character 'xue2' meaning to study. In addition to changing the character code from Unicode 字 ('zi4') to Unicode 学 ('xue2'), the exemplary application may also remove the two graphic inputs. If the message is a picture message, the exemplary messaging application may provide tools that allow the user to use graphic inputs to alter the picture itself, such as translating all or part of the image, mixing graphic inputs with the picture, changing the image hue or brightness, or altering other qualities of the image. If the message is a voice text, graphic inputs can be operable to cause the voice text to play, pause, or be deleted. Such effects in messaging are not possible today when graphic inputs are limited to individual message units, such as message 124 in FIG. 1D.

FIGS. 5A and 5B are plan views of a programmatic environment operable to maintain the alignment of messages and graphic inputs displayed on communication devices with different screens. Illustrated in FIG. 5A is a communication device 500 (USER A's device) displaying a conversation field 205 on a screen 501 that has a 3:4 aspect ratio; and illustrated in FIG. 5B is a communication device 502 (USER B's device) displaying the same conversation on a larger screen 503 with a 1:1 aspect ratio. Methods for restricting the area on which a user can enter graphic inputs is also described.

The conversation field 205 may contain the entire data content of a messaging session or a portion of that content. A plurality of messages are shown on the conversation field. USER A sent messages 504, 507, 509, and 511 appearing on the right side of his communication device 500. USER B sent messages 505, 506, 508, 510 and 512 appearing on the left side of his communication device 512. Two graphic inputs are also shown on the conversation field. USER A sent graphic input 502 pointing to messages 507, and USER B sent graphic input 514 circling message 510. The active view 515 is a subset of the conversation field and is shown with a plain white background and contains messages 509, 510, 511 and 512 that are rendered for viewing on a communication devices screen. Messages 504, 505, 506, 507, and 508 are outside the active view; these messages are saved in memory and rendered for display in the historic view if the user scrolls to the top of the active view and pushes the 'Show More Messages' button 516. Messages may contain a variety of content types, including but not limited to, text messages, picture message, voice messages, video messages, location sharing messages, etc. It is also possible that all messages are of a single type; for example the conversation may consist entirely of picture messages, or may contain only text messages, etc.

In the exemplary embodiment, conversation data is maintained on a server and delivered to the messaging application as an HTML page that is rendered as the conversation field 205 in a webview. The active view is composed of three primary HTML elements stacked over top of each other in layers (called the 'primary layers'), including: (1) a topmost transparent HTML5 <canvas> canvas element onto which the device user's graphic inputs are drawn; (2) a second transparent HTML5 <canvas> canvas, beneath the topmost layer, onto which received graphic inputs are drawn; and (3) an HTML <ul> element containing a list of <li> elements to display sent and received messages positioned beneath the two canvases. Before the user pushes button 516, the three primary layers fill the entire vertical height of the HTML page. It should be noted that while the webview displays the conversation field 205 as an HTML page in a webview, other elements of the exemplary embodiment, such as the send button 211, input field 210, picture button 303, and graphics toolbar 213 with associated buttons, as described with reference to FIGS. 2A, 2B, and 3, may be native elements that interface with JavaScript running in the webview, such as by using the iOS function 'stringByEvaluatingJavaScriptFromString', as would be readily understood by a person knowledgably in the art.

The HTML canvases are used for drawing graphic inputs, and each contains a coordinate system with its origin 517 at the top left corner of the canvas. The top left corner of the canvases are positioned at the top left corner of the HTML page that makes up the active view. The coordinate systems of both the first and second canvas are identical, such that regardless of the canvases' CSS properties or display size on a screen, their internal or programmatic coordinate systems are identical and proportional. For example, the canvases may contain a coordinate system that is 300 points wide, with their height determined by the ratio of their physical height to physical width. If the canvas is physically a square, then the coordinate height is also 300. If the canvas is 3 times taller than it is wide, then it's coordinate height is 900. Such coordinate systems are common properties of the HTML5 canvas element and should readily be understood by a person knowledgeable in the art.

The exemplary application is operable to detect user inputs on the topmost canvas using JavaScript touch events attached to an event listener. The touch event returns an object with an x- and y-value indicating the coordinate location of the user input on the canvas. Since both the first and second canvases have the same programmatic coordinate size, a graphic input entered on the top canvas of user's device is easily rendered in a proportional position on the second layer of a receiver's device when the coordinate values are sent to the receiver. For example, if a canvas as a coordinate system 100 points wide, and the canvas is displayed full-width on a device with a 4 inch wide screen, then a graphic input entered at coordinate with x value equal to 50 is displayed on the device screen two inches from the left. When the x-coordinate of the graphic input is transmitted to another device that displays a canvas with a coordinate system 100 points wide on a 10-inch wide screen, the graphic input is displayed five inches from the left of the screen. In either case, the relative position between the graphic inputs and the conversation field is maintained as the internal coordinate system of the canvas is identical across device.

More specifically, the exemplary application employs three JavaScript event listeners associated with webapp 802 when running on the client-side application 806 or 808, including a 'touchstart' listener, a 'touchmove' listener, and a 'touchend' listener, to determine if a user entered a graphic input. These and other standard listeners, such as 'mousedown', 'mousemove', and 'mouseup' listeners, should be readily understood by a person knowledgeable in the art. Each time the user enters a graphic input at a point on the canvas and a touchstart or touchmove listener is called, the exemplary application sends a data packet using known methods as discussed with reference to FIG. 8 to the server consisting of: (1) an indicator that the message is a graphic input, (2) an indicator specifying if the canvas point should be associated with erasing or drawing, or some other activity, (3) the x-coordinate of the canvas point, (4) the y-coordinate of canvas point, (5) an integer value associated with the radius of the graphic input at the canvas point, (6) the sender of the graphic input, and (7) the recipient of the graphic input. When a touchend listener is called, the exemplary application sends a stop path command to a receiving device. Other data may be associated with a data packet, such as, but not limited to, the color of a graphic input or an indicator of whether a push notification should be sent.

When the communication device receives a graphic input data packet, it draws a circle with specified radius at the canvas coordinate specified in the data packet. If a second graphic input data packet arrives, the communication device draws a circle with specified radius at the coordinate specified in the second packet. If no stop path command was received after the first data packet arrived and before the second data packet arrived, the communication device also draws a line with the same radius connecting the two previously mentioned points. If the receiving devices receives a stop path data packet, it calls a beginPath( ) command on the context of the HTML canvas, as should be commonly understood by a person knowledgeable in the art.

If a user touches the screen and then lifts his finger before moving it over any other canvas points, then a single graphic input data packet is sent followed by a stop path command, resulting in a single circle or dot being drawn to the screen at the corresponding coordinate point and with the corresponding radius on a receiver's communication device. The exemplary application may be operable to draw another shape at the canvas coordinate, such as a square, a star, or other symbols, or positioned a separate element of the desired symbol or shape on the HTML page. The graphic data associated with the symbol may be sent in whole or in part from the first user to the second user. For example, if the graphic is a unique picture, data necessary to reproduce the picture may be sent to a second user. If the graphic is a predefined symbol with shape data available on both devices, then the first device may send a shape code indicating the shape that the second device should render. In another embodiment, the client device sends data related to any pixel or canvas coordinate changed on the canvas. In such an embodiment, the size of the pen or eraser need not be sent as the messaging application simply indicates which pixels have been affected by a user; if a large pen is used, more pixels will be affected when entering or erasing graphic inputs.

It should be noted that the same HTML page, such as would include the <ul> list and 2 <canvas> canvas elements, displayed on different browsers or browser powered webviews won't necessarily be rendered identically because different browsers assign different default parameters, for example margin size or padding size, to like HTML elements. To ensure that any browser or webview that displays the HTML page uses the same display settings, a CSS reset sheet is used to reset all, or nearly all, style parameters to preconfigured values. This method of maintaining visual continuity between browsers should be readily understood by a person knowledgably in the art, and is used by the exemplary application to ensure that messages and graphic inputs will be displayed proportionally and with like alignment on different devices.

As illustrated, both device 500 and device 502 display the conversation field proportionally across the horizontal width of their screens. Since the placement of messages and graphic inputs on the conversation field is controlled by a single set of display logic, and the coordinate systems of the canvases are stretched with the conversation field, the relative position between the messages and graphic inputs is maintained regardless of screen size as long as the three layers mentioned above remain stacked over top of each other. Specifically, because the <ul> list of messages is displayed in the same position relative to the canvases regardless of screen size, graphics processors can use the position data of the HTML elements (collectively the relationship data) to render a message and graphic inputs received on the canvas in association with that message with identical alignment on devices with different sized screens. The 'stretching' of the conversation field to fill the horizontal width of the screen may be accomplished using the zoom-scale feature of the webview, which changes the viewing zoom of the entire webpage and all its elements, including the three primary layers, thus ensuring that the conversation is rendered without distortion.

In addition to keeping graphic inputs and messages aligned using the relationship data associated with the three primary layers as described above method, any known method of associating data may be used to associate a particular graphic input with a particular message, such as in order to generate additional relationship data to aid in keeping messages and graphics aligned or identify a message to which a graphic input relates, such as when modifying the message as described with reference to FIG. 4. For example, the exemplary application maintains several sets of arrays, with each array holding the coordinate data of the points that make up a graphic input at separate indexes. As the canvas and <ul> list is aligned with the canvas, a coordinate point on a canvas can be easily associated with a reference point of a <div> element that encapsulates a message, such as by using the offset( ) method for an html element inside a webpage. For example, if a canvas is aligned at the top left corner of an HTML page and is 100 pixels wide by 100 pixels tall, and contains an inner coordinate system that is 50 x-coordinates wide by 50 y-coordinates tall, and a graphic is entered at a coordinate point (10,10) on the canvas, than that graphic can be associated with the top left corner of a message <div> element that is offset on the HTML page by 20 pixels right and 20 pixels down. Depending on the height and width of the <div> element, a graphic input can be associated with any position within a message, or associated with its distances outside a message.

Users can then scroll through the conversation field to view the conversation. In the exemplary application, users scroll up and down through the conversation, though it is imaginable that a conversation field positions messages in a horizontally scrollable environment. It should be noted that the user of device 500 sees more of the conversation displayed on his screen at any one time than the user of device 502 due to a greater height to width ratio of device 500. It should also be noted that a scrollable environment may be as large as the device screen such that a user need not scroll through the conversation as all messages in the conversation which are rendered are displayed simultaneously. In such an embodiment, it should be understood that the messages themselves scroll across the scrollable environment as new messages are added to the screen at the end of the conversation and old messages are removed from the screen when removed from the beginning of the conversation.

It should also be noted that while FIGS. 5A and 5B show the conversation 'stretched' or 'zoomed' to fill the entire horizontal width of the screen, any subset of the communication device screen may be designated for the conversation field. For example, on a large tablet, the conversation field may be displayed in a scrollable field on one side of the screen, while a list of contacts is displayed simultaneously on another side of the screen. Such an alternative embodiment can easily be created by natively drawing the webview on a subset of the screen. The HTML page that displays the conversation field can then be displayed across the webview or across a subset of the webview. Such manipulation of a native webview, as is commonly found on a mobile device, should readily be understood by a person knowledgeable in the art.

The exemplary application also maintains the relative position between a message's content and its container, such as a message bubble, or a graphic input that pointed to a specific element in a message on a sender's screen may not point to the same element on a receiver's screen. To maintain the relative position between the typed-text of message and a message container itself, the exemplary application specifies the various font parameters of the text message, such as font size, weight, font type, etc., that determine how the text will be displayed and wrapped by using a CSS reset sheet and specific CSS value. In another embodiment, an application may fix the number of characters that can be displayed in a single line in a text message, while also fixing the font type, relative size, and other attributes of the text to provide a consistent presentation across different devices. Maintaining the relative position between graphic inputs and characters is particularly important if the application employs character modification methods similar to those described above. If the message is picture message, as described with reference to FIG. 3, the exemplary application displays the picture within a <li> element with a width defined relative to the width of the conversation field. For example, a picture message may be displayed centered in the conversation field with a width equal to 90% of the conversation field width. Since the height of the picture will be a ratio of its width, the picture message's position relative to the rest of the conversation will be rendered properly regardless of screen type, such that graphic inputs can be associated with individual elements of a picture message.

In the exemplary application, the active view is defined to have a maximum number of messages that can be displayed. When the maximum number of messages is reached, and an additional messages is added, the exemplary application removes the oldest messages from the top of the list and adds the newest messages to the bottom of the list. The oldest message is added to the historic data. To keep the graphic inputs and messages aligned, the exemplary application shift all graphic inputs on the canvas up by the height of the last message that was removed. Specifically, the application: (1) saves a copy of both canvases, (2) calculates the height of the last removed message, (3) clears the original canvases, and (4) redraws the saved copies back to the original canvases starting at the y-coordinate on the saved copies that corresponds to the height of the removed message. In an alternative embodiment, the active view is defined to have a maximum height. Each time a message is added, the height of the active view, including the three primary layers, increases until the maximum height is reached. When an additional message is added, messages are removed from the beginning of the list until the total height of the active zone, including the new message, is again less than the maximum allowable height. The application then: (1) saves a copy of both canvases, (2) clears the original canvases, and (3) redraws the copied canvases back to the original canvases starting at the y-coordinate on the copied canvases that corresponds to the combined height of the removed messages. The removed message(s) and corresponding graphic inputs are then saved in the historic data for possible viewing at a later time.

Figure 7:
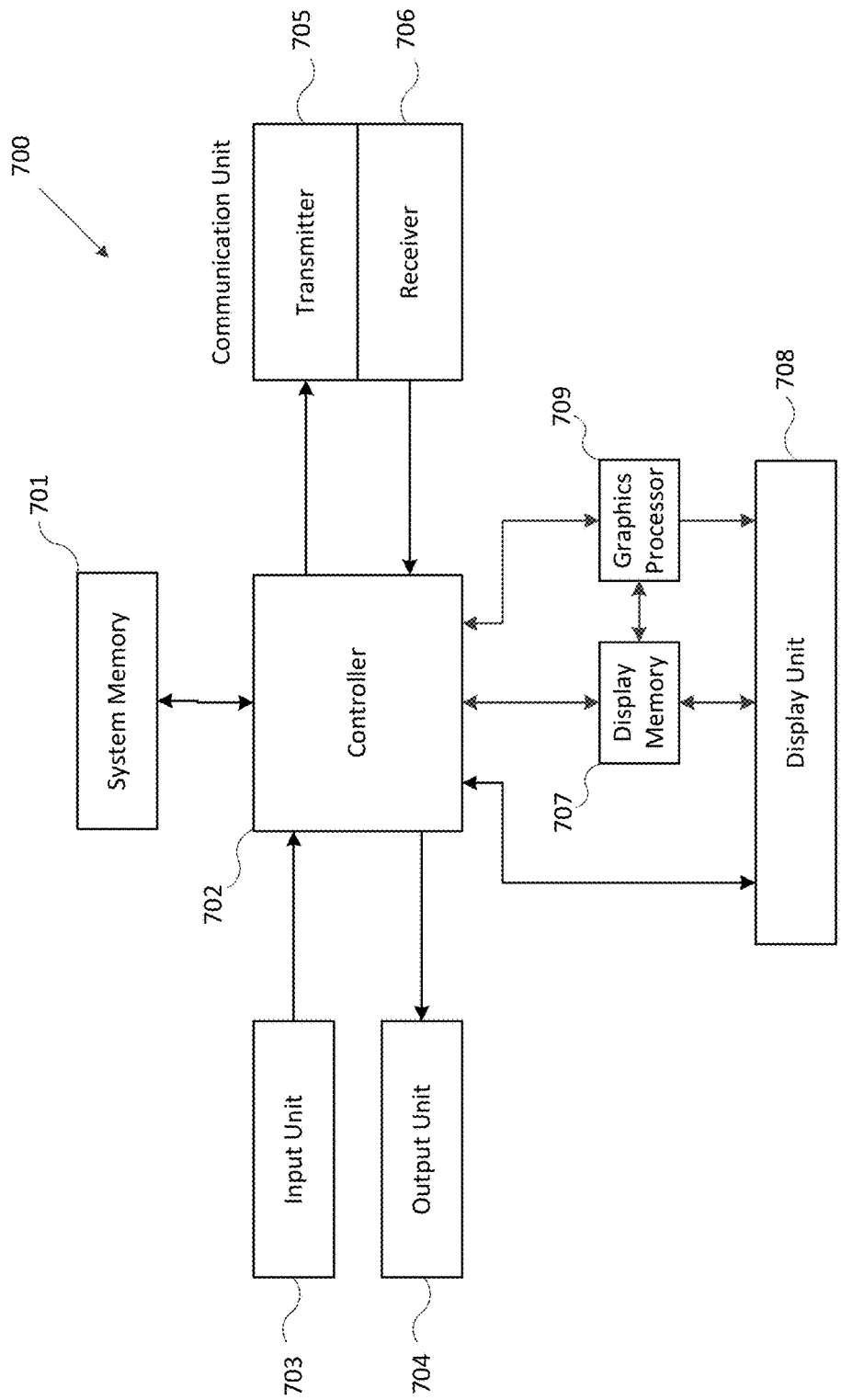
FIG. 7 is a block diagram of an exemplary hardware architecture of a communication device operable to implement the messaging application.

It should be noted that the controller 702 in FIG. 7 including associated graphics processor 709, as well as the system memory 701 and display memory 707, of a communication device operable to run the exemplary application performs significantly more work than when running a prior art application. On a known application, such as the application described with reference to FIGS. 1A-1E, when an addition message is sent, it is added to the end of the conversation with no effect on the data associated with any prior message or graphic inputs. For example, message 124 in FIG. 1E is not affected by the sending of additional message 125. By contrast, the canvas(es) in the exemplary messaging application are themselves images, which as described above, must be copied, erased, translated, and redrawn each time a new message, such as a text message, picture text, or voice messages, is added to the conversation.

If a first user is at the top of the active view in graphics mode, and the active view has reached its maximum allowable message limit, and the user receives a message from another user with whom the first user is communicating, the exemplary application may not remove the last message from the active view, as this action might prevent the first user from finishing entering or erasing a graphic input at the top of the active view. Rather, the exemplary application may extend the active view until the first user has scrolled away from the top of the active view or until a predetermined time limit has elapsed or a predetermined number of messages has been received. If a user is not at the bottom of the conversation field when a message is received, the exemplary application may display an indicator, such as an arrow, indicating that a message was received and the user should scroll down to view it. If the user is not at the location on the conversation field where a new graphic input is received, the exemplary application may display an indication that the user should scroll up or down to view the new graphic input. In an alternative embodiment, the messaging application might automatically scroll a user to the bottom of the conversation field whenever a new message is received, or might automatically scroll a user to the location on the conversation field where a new graphic input is received. The exemplary application also displays an indicator for a receiving user when a sending user is typing, and may display an indicator that the sending user is entering a graphic input.

When button 516 is pressed, the server retrieves from memory the data associated with a set of messages and corresponding graphic inputs, and sends them to the user's communication device. The retrieved data is displayed in three similarly stacked layers on the HTML page and make the historic view. The historic view and active view are then displayed top to bottom with the active view at the bottom of the HTML page and the historic view at the top of the HTML page. The historic view and the active view do not overlap, but form a cohesive whole through which the user can scroll. In an alternative embodiment, the historical view is rendered with only two layers: (1) a <ul> list layer to display messages, and (2) a canvas layer that displays both previously sent and received graphic inputs on one canvas. In such an embodiment, the historical graphic input may be stored as either one set of data or two sets. In yet another embodiment, the <ul> messages and graphic inputs are all either stored or displayed on a single canvas, or stored and displayed as a single <img> element. In an alternative embodiment, conversation data is not stored on the server, but is stored on each individuals' communication device, and may use any of the above mentioned methods to render their view.

The exemplary embodiment allows users to enter, erase, or otherwise modify graphic inputs only in the active view 515, or in some embodiments only in a subset of the active view. Users cannot enter graphic inputs in a historic view. This method creates conversational continuity by ensuring that distant conversations are not altered, which might cause confusion and require additional server rendering when users scroll back in their conversation history to find where the conversation was altered. As illustrated in FIG. 5A, the user of communication device 500 cannot presently enter or erase graphic inputs because the portion of the conversation field displayed on screen 501 is in the restricted historical view and outside the active view; but the user of communication device 502 in FIG. 5B can enter or erase graphic inputs because the portion of the conversation field displayed on screen 503 is within the active view.

If the user attempts to add graphic inputs to the historic view, no graphic inputs will appear because no graphic input event listeners are associated with the topmost canvas of the historic view. In another embodiment, the application may specify a maximum distance in canvas coordinates from the bottom of the conversation beyond which graphic inputs cannot be entered. In a different embodiment, the application may set a maximum number of messages back from the most current message beyond which a graphic input cannot be entered. In yet another embodiment, the exemplary application may set a time limit beyond which a graphic input cannot be entered. For example, the exemplary application may not allow graphic inputs to be entered beyond messages that are over 24 hours old. It should be noted that while the active view of the exemplary application comprises that area of the conversation field onto which a user can enter graphic inputs and displays those messages which are not in the historic data, some methods described above may restrict entering graphic inputs to a subset of the active view, such that some messages may neither be in the historical data nor annotatable using graphic inputs.

The exemplary embodiment assigns to which side of the screen a user's messages are displayed based on which user initiated the conversation. Specifically, the initiator of a conversation is always assigned to the right side of the conversation field. As such, a user's messages would appear on the left side of his screen in some conversations, while appearing on the right side in other conversations. As illustrated in FIGS. 5A and 5B, USER A's messages are displayed on the right side of both communication devices 500 and 502, while USER B's messages are displayed on the left side of both communication devices 500 and 502. Other methods for determining which side of the screen to display a user's messages may be used. To aid the user in identifying his messages, a user's messages may be displayed using a similar or identical color regardless of conversation.

Aligning the messages on either side of the screen may be accomplished using the 'float' property of a <div> element within an <li> list item with a width equal to, or nearly equal to, the conversation field width. The <div> elements, which contain the content of the message, for example typed-text or an image, can float from left to right within the <li> element, as should be readily understood by a person knowledgeable in the art. In a native environment, such as in an iOS app, a view containing a message may be aligned on one side of the screen or the other, as should be readily understood by a person knowledgeable in the art.

It should be noted that this method of displaying a messaging conversation is quite different from today's messaging applications, which render a user's messages on the same side of his or her own screen regardless of conversation. For example, if two users are communicating using a prior art messaging application, the first user's messages would be displayed on the right side of his communication device screen, and the second user's messages would likewise be displayed on the right side of his communication device. In order to provide graphic inputs of the exemplary type, and keep drawings and messages aligned, prior art would have to disclose a method of inverting the drawings along a center axis. However, such a method would result in hand drawn words (such as graphic input 206 in FIG. 2B, the word "Yay"), being inverted and difficult to read unless a method was disclosed for identifying and not inverting hand drawings. However, inverting some graphic inputs while not inverting words could lead to further confusion when a graphic input which is a word is combined with a graphic input which is a symbol, such as an arrow, and the arrow is inverted but the word is not inverted, resulting in the arrow and word not being properly connected. In addition, simply inverting graphic inputs along a center axis would not keep graphic inputs and messages aligned on devices with different screens unless protocols were used to ensure that the relative positions between messages was maintained across devices, and the relative size between messages and screens was maintained. Such protocols or methods necessary to provide for the exemplary application and aid users in identifying the author of messages and graphic inputs, are not found in the prior art.

While the exemplary application has been described with reference to a hybrid application using a webview to display the conversation field on an HTML page, it should be understood that this is not the only method of displaying a conversation or generating relationship data between graphic inputs and messages. In an alternative embodiment, the conversation field is rendered using native client-side logic. Such an embodiment might render an active view of a predetermined coordinate width, and then position successively received or sent message at a predetermined angle and offset from the last message. By additionally maintaining an aspect ratio between a message bubble's size and the width of the active zone, and by fixing font and other characteristics across devices, such a messaging application could provide a uniformly proportional display on different sized screens. On an iOS device, the QuartzCore framework could be used to detect and draw graphic inputs on a view, and the coordinates of those graphic inputs relative to a standardized coordinate system proportional to the screen size could be sent to a receiver where graphic inputs are redrawn on another view.

It should also be noted that FIGS. 5A and 5B illustrate an additional advantage of the exemplary application over certain known applications that provide users with a chat conversation and a completely separate drawing window that must be erased each time users want to add more graphic inputs. With such applications, like Twiddla or ConceptShare, users cannot draw in the chat conversation, so in addition to an inability to associate graphic inputs with messages, no persistent copy of the conversation and graphic inputs exists for future review. By contrast, as a conversation progresses with more messages added to conversation field 205 in the exemplary application, graphic inputs maintain their position in the conversation relative to messages, creating a persistent record of the conversation with graphic inputs. Users can scroll back through the conversation field 205 to view previously sent graphic inputs and messages, such as the graphic input 513 displayed on device 500 illustrated in FIG. 5A. In addition, unlike a static whiteboard that must be erased to make room for more graphic inputs, the exemplary system continues to create empty space for entering graphic inputs each time a message is sent or received. While such a prior art application is operable to engage a communication unit, including a transmitter and receiver, to communicate graphics in real time while simultaneously engaging a graphic processor to display a chat conversation, the prior art graphic processor doesn't use the graphic data sent or received by the communication unit when rendering the chat conversation, nor does the graphic processor use message data when rendering the graphic inputs in the separate whiteboard. The exemplary application, by contrast, must utilize both the messaging data and graphic data when rendering either messages or graphics.

FIGS. 6A-6E are a flowchart illustrating the execution of the exemplary messaging application.

Figure 6A:
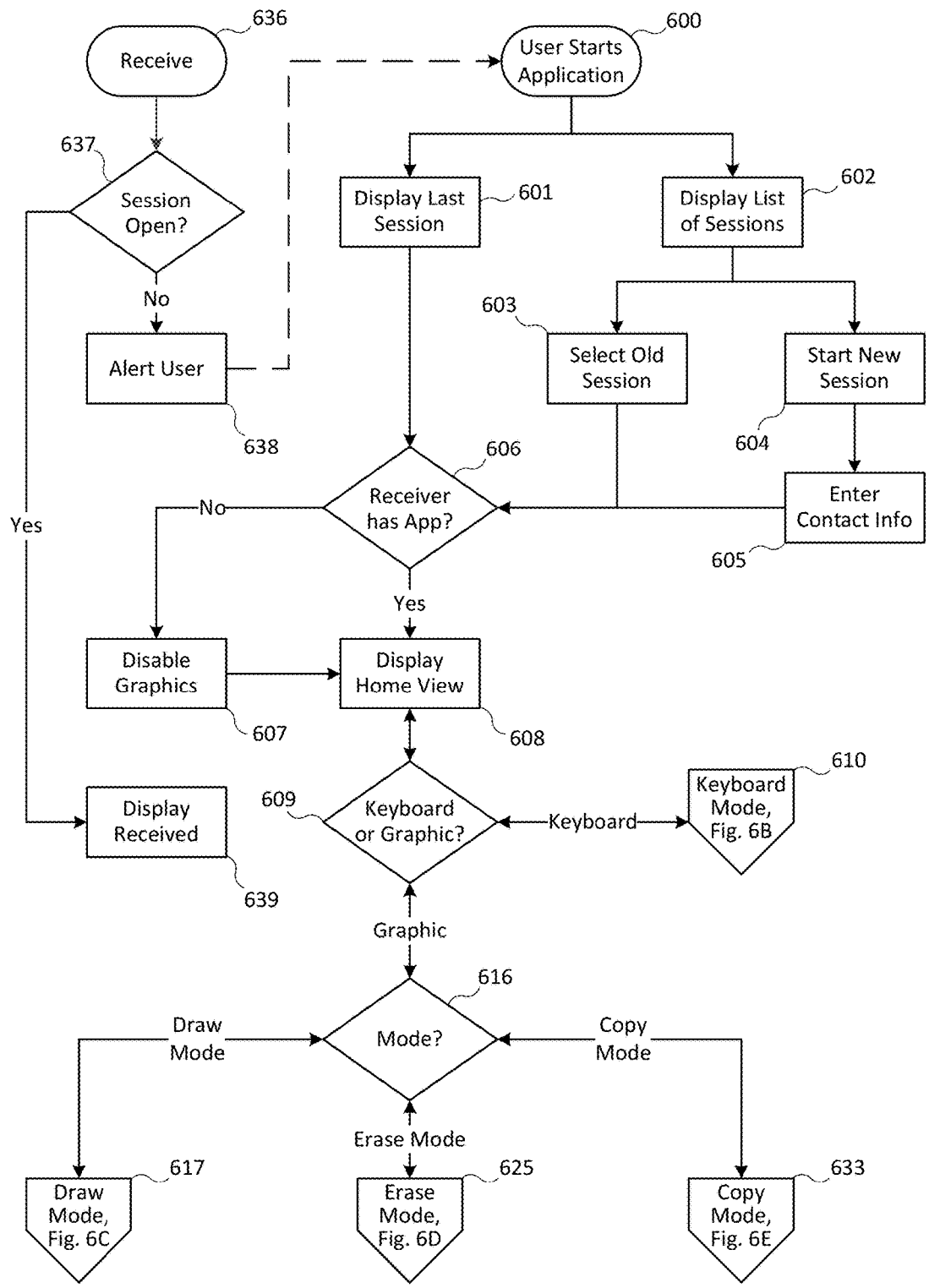
FIGS. 6A-6E are a flowchart illustrating the execution of an exemplary messaging application.

FIG. 6A illustrates the execution of the exemplary messaging application. When a user starts 600 the messaging application, the screen that was last displayed is displayed again, which may be the last messaging conversation, also called a session, that the user had open 601, or an index of conversations 602. If a conversations list 602 is displayed, the user may select a previous conversation 603 from the list, or start a new conversation 604. Such a list might be displayed on a native communication device, such as an iPhone, using a table view controller, as would be commonly understood by a person knowledgeable in the art. While a loop back to 602 is not illustrated, the conversations list screen is accessible at any point in the program from the messages button 219 illustrated in FIG. 2A.

If a user chooses to start a new conversation 604, the contact information of the receiver is entered 605 using an input device or loaded from a contact list. The contact information may include, but is not limited to, a phone number or a username associated with an account, such as an account with the exemplary messaging application or with another application. When the receiver's contact information is entered, the messaging application determines if the receiving device is enabled with a messaging application that can receive graphic inputs of the exemplary type at step 606. If the receiving device is not enabled with graphic inputs, graphics mode feature is disabled 607, and only messages may be sent between the devices, such as SMS messages, MMS messages, voice messages, etc. If both messaging applications are enabled with graphic inputs, graphics mode remains enabled.

At 608, the messaging application enters a conversation in keyboard mode and at the bottom of the active view, such that the last message(s) sent or received are displayed. This is called the home view. A user can then switch between keyboard mode or graphics mode at step 609.

From the home view, a user may continue in keyboard mode 610, or may enter graphics mode 616 as described with reference to FIGS. 2A and 2B. While in graphics mode, the user may push the draw button 215 to enter draw mode 617 (FIG. 6C), or push the erase button 216 to enter erase mode 625 (FIG. 6D), or push the copy button 217 to enter copy mode 633 (FIG. 6E), whereby the draw, copy, and erase buttons are illustrated in FIGS. 2A and 2B.

Figure 6B:
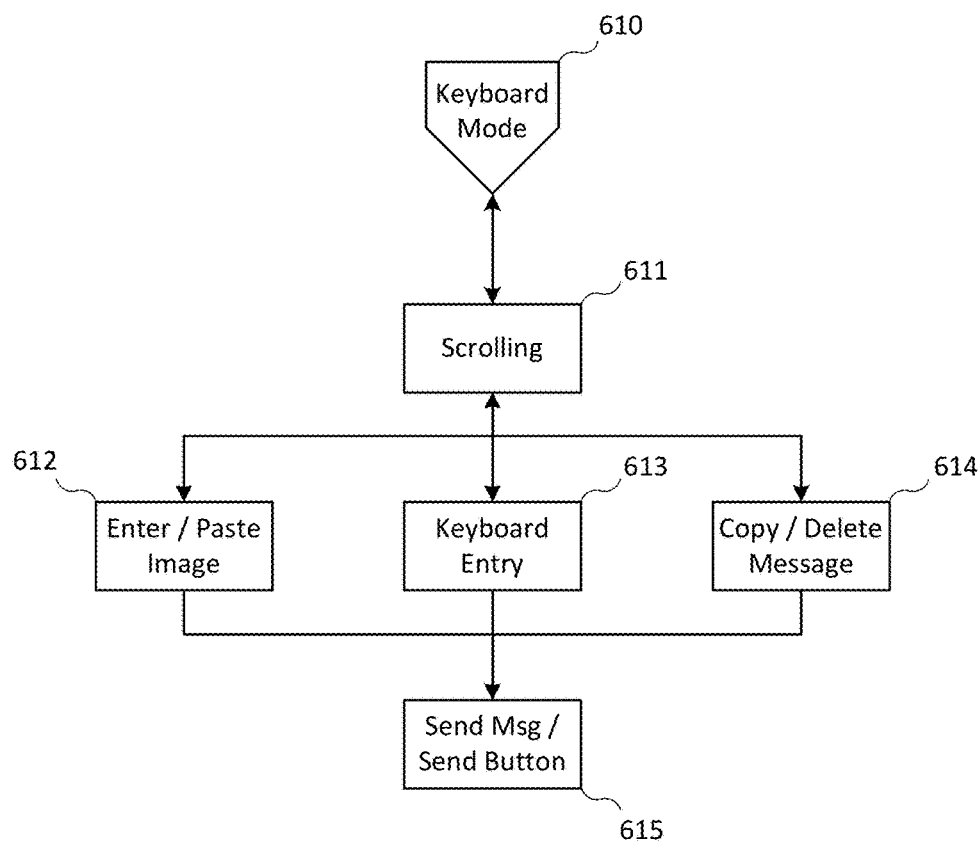

FIG. 6B illustrates keyboard mode 610 of the exemplary messaging application. When in keyboard mode, text messages may be entered 613 via a keyboard or other input device as input unit 703 of a user's communication device illustrated in FIG. 7. Pictures may be entered 612 using the picture button 303 or pasted into the text field 210 as discussed with reference to FIGS. 2A, 2B and 3. A user may scroll 611 through the conversation field 205 by swiping the touch screen, and messages may be deleted or copied 614. After a message is created, a user may send the message 615 to a receiver by pushing the send button 211 as described with reference to FIG. 2A, with the message sent by the communication unit of his communication device, including a transmitter 705 and receiver 706 illustrated in FIG. 7. When a user sends a message, the application engages a graphics processor 709 to not only display the message at the end of the conversation, but also reposition the graphic inputs on the screen so as to maintain the alignment between messages and graphic inputs, such that a graphic input that was associated with a message before a new message was added to the conversation is associated with the same message after the new message is added to the conversation. This method of engaging a graphics processor to render graphic inputs when a message is received is not found on prior art communication devices, because no association exists between a graphic input and a message.

Figure 6C:
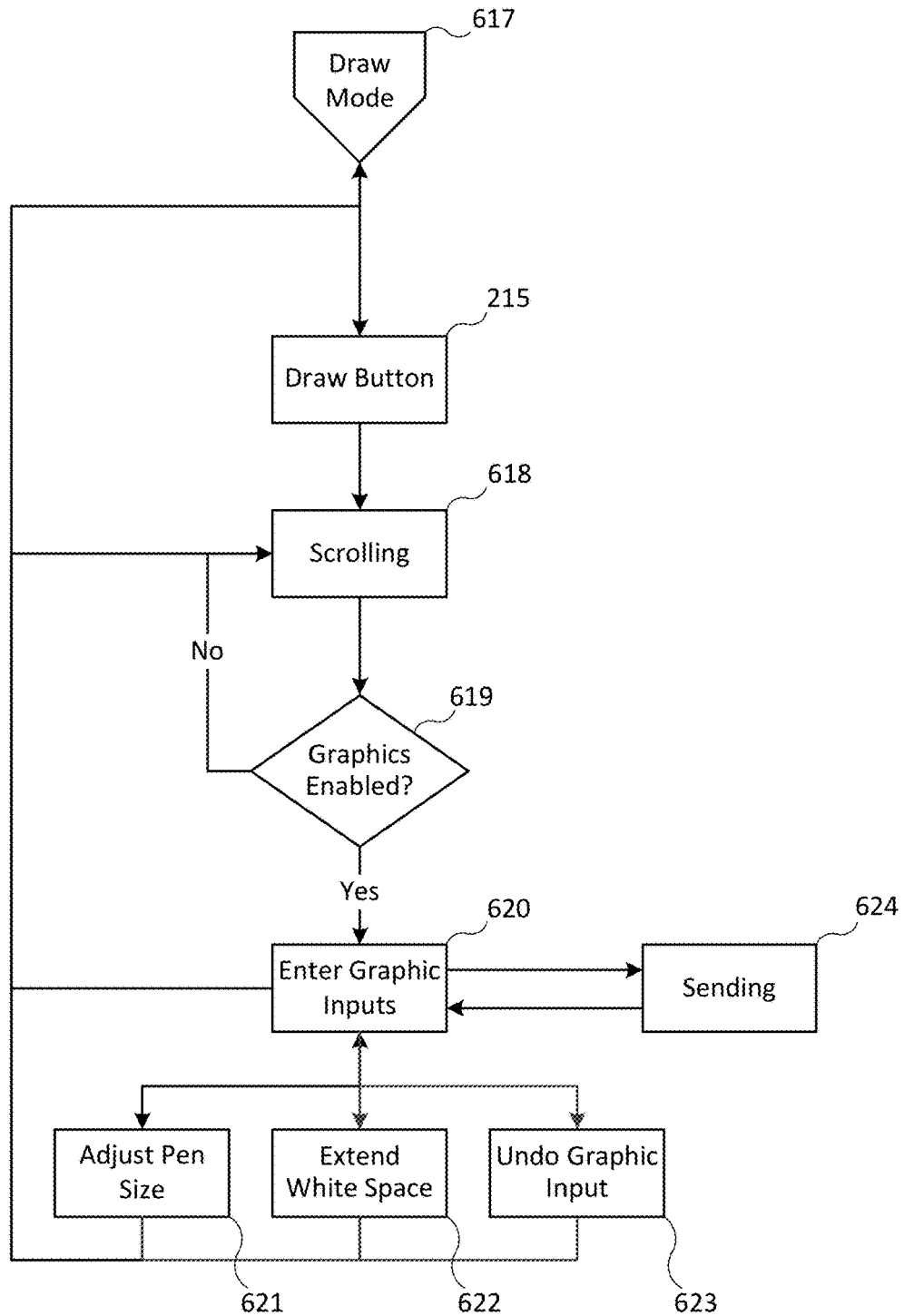

FIG. 6C illustrates draw mode 617 of an exemplary messaging application. If the user presses the draw button 215 illustrated in FIG. 2B, the exemplary messaging application enters draw mode, and the user can enter graphic inputs by touching the touchscreen with a finger or a stylus, associated with an input unit 703 of his communication device as described in FIG. 7, with the graphic inputs displayed on his device screen and sent to one or more receivers. The user may scroll 618 through the conversation field using two finger scrolling or by activating a scrolling bar (not shown). In step 619, the messaging application determines if drawing is enabled. Drawing is enabled if the user is inside the active view and graphic inputs were not disabled at step 606 as described with reference to FIG. 6A. If graphic inputs are enabled, the user may enter graphic inputs at step 620 using and the messaging application will transmit 624 the corresponding data to a receiving communication device(s) using a communication unit of his communication device, including a transmitter 705 and receiver 706 illustrated in FIG. 7. It should be noted that unlike prior-art applications that engage the communication unit of a device only after the user has finished composing graphic inputs and subsequently executes a send command, as was discussed with reference to send button 122 in FIG. 10, the exemplary application actively engages a communication unit of the communication device while the user composes a graphic input in order to send the graphic input point-by-point to a receiving device at step 624 in FIG. 6C. As such, unlike in prior-art applications, step 624 is not an endpoint, but an iterative process associated with entering graphic inputs 620, as indicated in FIG. 6C by the two-way arrows connecting step 620 and 624. It should also be understood that unlike in prior-art applications, in the exemplary application a graphics processor 709 and/or controller 702 and display memory 707 in FIG. 7, are actively engaged to detect and render graphic inputs 620 on a display unit 708 such as touchscreen 101 while a user is scrolling 618 through his conversation field 205 and viewing messages. By contrast, in a known application, no direct link exists between the scrolling step 618 and the entering graphic inputs step 620, as the user must enter a separate drawing window, such as the simple drawing window described with reference to FIG. 3C, before the application engages the graphics processor 709 to allow the user to draw.

The user may also change the size of the drawing pen 621 using the size slider 218 or may remove the last graphic element entered using the undo button 214, whereby the slider and undo button are described with reference to FIG. 2B. The user may create more drawing space by swiping up on the screen when at the bottom of the active view in step 622 as described with reference to FIG. 2B. While not shown, the messaging application may control how much white space can be extended based on a variety of factors, such as how much unused space is available, how many messages are in the active view, how much time elapsed since the last time white space was extended, or how many times the white space has been extended. When a user extends the empty space at the bottom of the conversation, the messaging application ads a non-visible message to the end of the conversation and engages a graphics processor, such as graphic processor 709 in FIG. 7, to shift graphic inputs in the conversation to maintain their alignment with associated message bubbles similar to the methods discussed with reference to sending a message. The empty space message creates a separation between the message prior to it in the conversation and the end of the conversation and maintains a separation between the message prior to it in the conversation and any message added after it in the conversation. That empty space can then be filled with graphic inputs. It should be noted that there is not equivalent operation available on a prior art messaging application, nor is any equivalent operation necessary or useful without graphic inputs of the exemplary type, because the empty space could not be filled with communication content and so cannot be used to relay information.

Figure 6D:
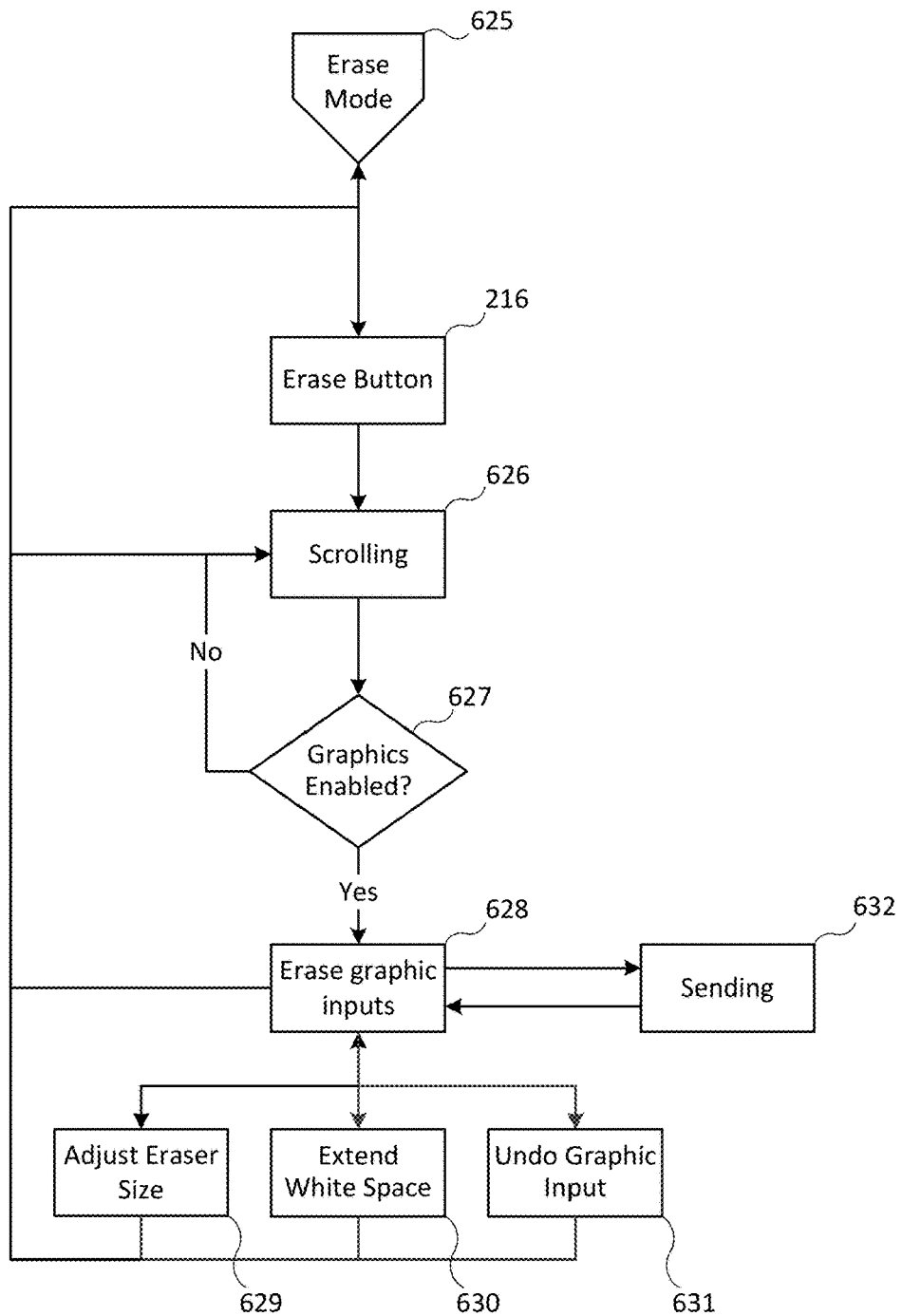

FIG. 6D illustrates erase mode 625 of the exemplary messaging application. If the user presses erase button 216 illustrated in FIG. 2B the exemplary messaging application enters erase mode. Erase mode behaves similarly to draw mode except that any canvas pixel contacted by an input device, such as a finger or stylus, in association with an input unit 703 in FIG. 7 reverts to the background color of the canvas, thereby giving the appearance of erasing. On a hybrid app incorporating a clear HTML 5 canvas, erasing is accomplished by applying a transparent black color to any area the user wishes to erase. In essence, erasing is the act of entering and transmitting transparent black graphic inputs. The user may scroll 626 through the conversation field, and at step 627, the messaging application checks if erasing is enabled. Erasing is enabled if the user is inside the active view and graphic inputs were not disabled in step 606 as described with reference to FIG. 6A. The user may change the size of the eraser in step 629 using the size slider 218 or may undo the last erase operation performed using the undo button 214, whereby the slider and undo button are described with reference to FIG. 2B. As the user erases 628 graphic inputs, the messaging application transmits 632 the corresponding data to a receiving device(s). As described with reference to FIG. 6C, step 632 is not an endpoint the operation of entering graphic inputs as it would be understood in a prior art application. Rather, step 632 is an ongoing processes of communication between a communication device's graphic processor and communication unit, as described with reference to a controller 702, a transmitter 705 and a receiver 706 in FIG. 7, operable to send a user's erasing graphic inputs point-by-point to a receiver.

Figure 6E:
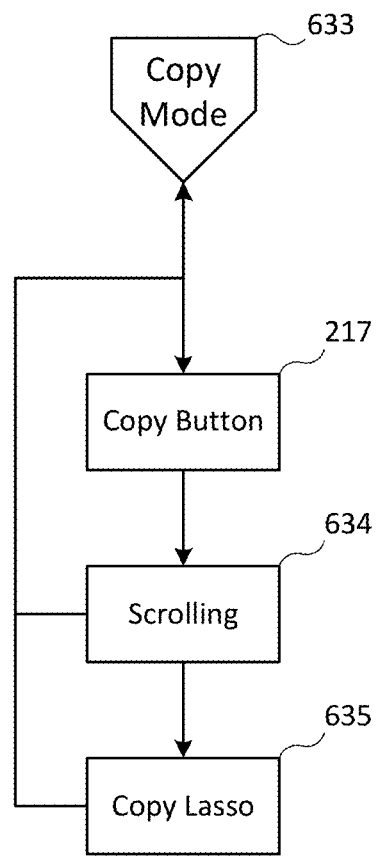

FIG. 6E illustrates copy mode 633 of an exemplary messaging application. If the user presses the copy button 217 illustrated in FIG. 2B, the messaging application enters copy mode. The user may scroll 634 through the conversation field and use a lasso tool 635, or other copy tool, to select and copy graphic inputs and messages. The graphic data associated with the copied graphic inputs and messages may be buffered in a display memory 707 and stored in system memory 701 in FIG. 7. The copied data may be exported to other software programs or pasted in the messaging application.

When the exemplary application receives a message or graphic input in step 636, such as by using a receiver 706 in FIG. 7 of a user's communication device, it first checks if the user is currently communicating with the user who sent the message in step 637. If the user is not using the application and thereby not currently communicating with the user who sent the received message, the exemplary application alerts the user 638 that a new message was received using an output unit 704, described with reference to FIG. 7, of the user's communication device, such as a vibrator, speaker or screen alert. When the user responds to the alert and starts the messaging application 600, the application initiates and automatically proceeds to decision step 606 to open the messaging session associated with the received message. The application then proceeds through the flow chart as described above. If the user is actively using the exemplary messaging application when a message is received from another user with whom the first user is not currently communicating, the messaging application alerts the user using an output unit and may be operable to display a banner showing all or a portion of the received message. The receiving user may then proceed to step 602 using the messages button 219 described with reference to FIGS. 2A and 6A above. If the user is in a conversation session with the user who sent the message when the message is received, the exemplary application proceeds from decision step 637 to displays the received message or graphic input on the conversation field in step 639.

FIG. 7 illustrates an exemplary system architecture of a communication device 700 operable to implement the methods described herein. For example, such a communication device could be a smartphone, a desktop or stationary computing device, a personal assistant, a pair of smart glasses, a laptop or mobile computer, a terminal computing device, a self-propelled computing devices, such as a mobile physician station, etc. It should also readily be understood that such a communication device need not maintain physical proximity between components or units, but could be operable as a distributed system.

The communication device 700 contains an input unit 703, such as touch screen 101, described above, providing a virtual keyboard and graphics input. An input unit may also be a separate hardware keyboard, computer mouse, trackball, joystick, graphical input device, such as a separate touchpad or a drawing tablet or graphics tablet, with a hard-wired or wireless (e.g., Bluetooth) connection to the communication device 700, or some device such as a camera operable to detect eye movement or hand movement in free space, or a device such as a microphone operable to detect voice commands, or other input device operable to allow a user to enter messages and graphic inputs, either incorporated in communication device 700, or a separate component with a wired or wireless connection to communication device 700. When the input unit 703 receives graphic inputs from a user, in communicates with the controller 702 via a signaling line to render the graphic inputs on the display unit 708 and send the graphic input to a receiver using the communication unit of the communication device 700, including the transmitter 705 and receiver 706.

The communication device 700 contains a display unit 708. The display unit may be a touch screen, an LED display, a computer monitor, or other display device operable to display incoming and outgoing messages and graphic inputs. The display unit may also be operable to act as the output unit for the controller, such as when displaying banner message indicating to a user that a message was received. The display unit receives signals from the controller 702 or signals stored in the display memory 707, which may act as a buffer between the display and the controller 702. The controller 702 may contain various dedicated graphics controllers, including both hardware and software controllers. When the controller receives signals from the input unit 703 it is operable to engage graphic processors to implement the methods described herein to display both the chat conversation and graphic inputs.

The system memory 701 contains RAM, ROM, cache, hard disk memory, or other computerized memory apparatus operable to implement the methods described herein. The controller 702 interacts with the system memory to transmit stored messages or graphic inputs to the display. The system memory stores data integral to the exemplary software, such as user application settings, pictures, past conversations, a contact list, and other data necessary to implement the method described above.

The communication unit is shown with two components, a transmitter 705 and a receiver 706. The transmitter and the receiver include known hardware components able to communicate with one or more of the Internet, a server, a public-switched telephone network (PSTN), either wired or wirelessly using any known standards, such as IEEE 802.11, code division multiple access (CDMA), Global System for Mobile Communications (GSM), Universal Mobile Telecommunications System (UMTS), Long Term Evolution (LTE), LTE-Advanced, or another communication network. The receiver 706 sends signals to the controller 702, which stores incoming data in the system memory and prepares necessary information for display. Both the transmitter and receiver communicate with communication networks using wireless or wired connections as is commonly understood by a person knowledge in the art.

When the controller 702 receives an input from the communication unit, it may send signals to the output unit 704, such as a speaker, a display, a vibration controller, or other output unit operable to alert the user that a message has been received or that other information is available. As mentioned above, the controller 702 may also send output information to the display unit 708. The output unit may be used to alert the user if a message or graphic input is received. The output unit or display unit may also indicate that a message or graphic input has been sent, or sent and subsequently delivered, such as by displaying a sent message, displaying a delivery message, playing a sound, or changing the color of a graphic input displayed on a sender's communication device when it has been delivered to a sender. The output unit may also indicate that a message or graphic input failed to send or be delivered. The output unit may also play audio messages if audio messaging or voice chat is enabled on the messaging application.

Figure 8:
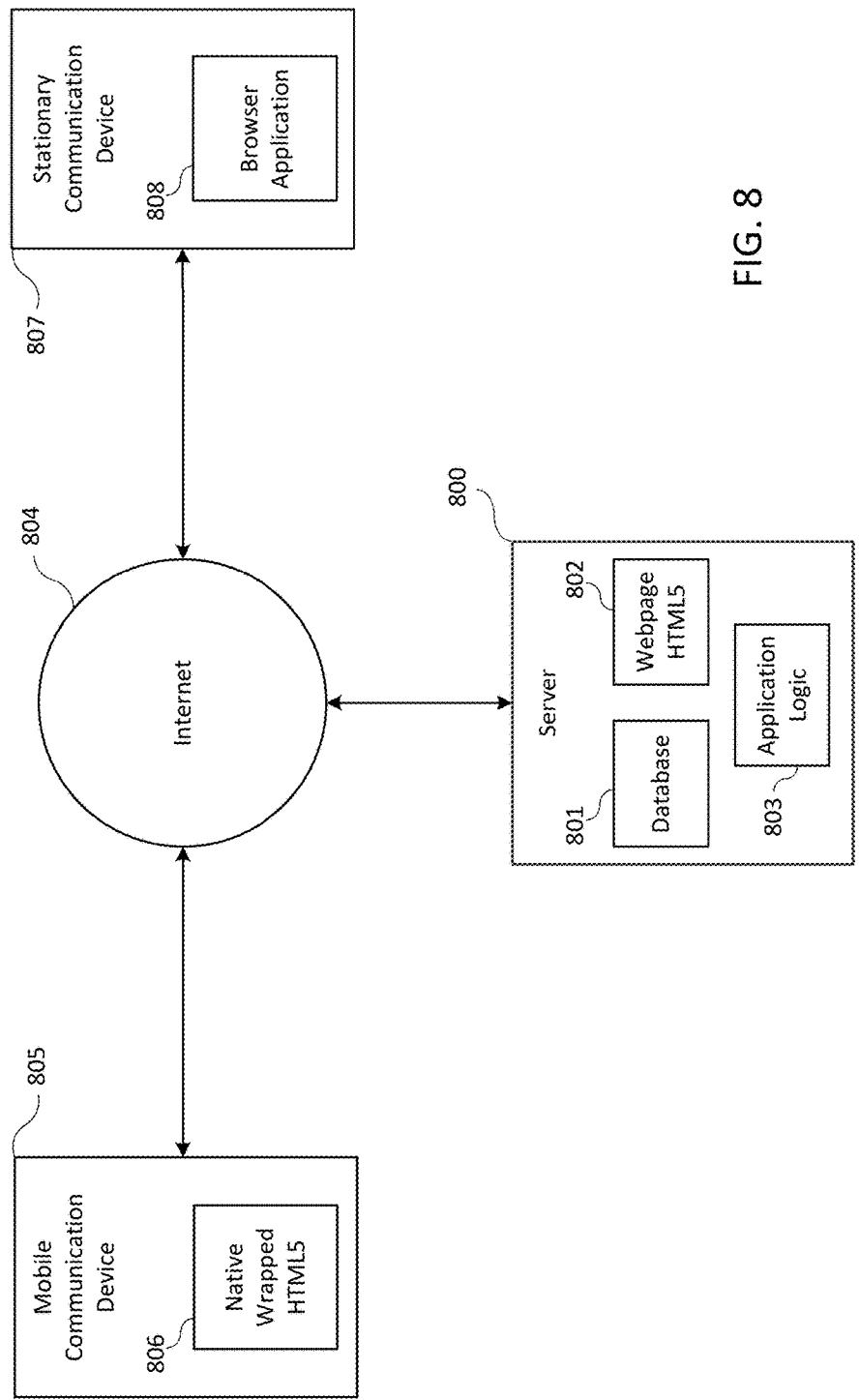
FIG. 8 is a block diagram of an exemplary network architecture operable to implement transmission of messages including hand-drawn graphic input.

FIG. 8 illustrates an exemplary network architecture operable to implement the method described above. Methods are also described for receiving and displaying graphic inputs on a device, such as by using a webapp. In this illustration, a web app is rendered by a client-side browser application

808, such as might be used on a desktop or laptop computer 807, and by a client-side mobile device 805 running a hybrid container application 806 that provides access to the hardware of a communication device and renders the HTML page in a native webview.

The server 800 includes an HTML web application 802, including HTML files, JavaScript files, and CSS files, for rendering a conversation on a communication device in application 806 or 808; a database 801 for storing application information, including user specific data such as authentication data, conversation histories, or contact lists; and application logic 803 running a Node.js server to execute the program on a server controller or processing unit (not shown). It should be understood that server 800 may work together with other electronic equipment, apparatuses, and services not shown, such as an SMS service and related equipment accessed by application logic 803 through a third party API, as should be readily understood by a person knowledgeable in the art. Other functions with their related equipment may include cache memory, an email service, an analytics logging service, etc. It should also be understood that the components of server 800 need not be located in the same physical location.

When the exemplary application is initiated on a client communication device, the communication device communicates through the internet 804 to authenticated into the server using a device specific ID. Examples of user or device specific IDs include a SIM card number on a mobile device, a MAC or IP address, a username and password, or a unique identifier provided to the device by the server when the application was installed on the communication device. Once a communication device is authenticated, the server may send the device conversation data related to a messaging session.

When a user opens a conversation session, as discussed with reference to FIG. 6A, the server and client device establish a connection using the Socket.io framework running on the server's Node.js server logic 803 and the client's JavaScript application running in a webview on the client-side application 806 or 808. After the socket connection is established, messages sent by a user are sent over the socket connection using a known protocol such as websockets, flashsocket, htmlfile, xhr-polling, jsonp-polling, etc. If a second device is also a party to the conversation session, messages sent from a first user to a second user are sent over the first user's socket connection to the server and then from the server to the second user over the second user's socket connection. If a first user sends a message intended for a second user who does not have a socket connection established, the server sends all or part of the message to the second user using SMS messaging, MMS messaging, or a push notification service, as should be readily understood by a person knowledgeable in the art. When a JavaScript listener, as discussed with reference to FIGS. 5A and 5B, detects an input on a canvas of webapp 802 running on a client-side application such as device 806 or 808, the exemplary application sends a data packet containing graphic data through socket connection to the server so it can be delivered to a receiver. The communication device uses the socket connection to create a real-time connection between clients so that graphics can be transmitted as a user enters them, and so that an application can send and receive graphic data in real-time. It should be noted that standard texting protocols, such as SMS or MMS cannot create such a live real-time connection, and instead require that a graphic input be composed in it's entirely and then sent as a single message, as described with reference to FIG. 10.

The hybrid architecture employed by the exemplary application simplifies the process of keeping graphic input and messages aligned as discussed with reference to FIGS. 5A and 5B by allowing one set of display logic associated with webpage 802 to control how a conversation is displayed on various devices. To further facilitate the alignment of graphic inputs and messages, the exemplary application maintains a single persistent copy of the conversation on server 800 in database 801. When a first user enters a conversation session, as described with reference to FIG. 6A, a copy of the conversation data associated with that session is sent to the first user along with the HTML page 802 as a stringified literal embedded in a <data> tag. Each time the first user sends a message, his device not only sends a data packet associated with the message to the server for delivery to a recipient, it also sends a copy of both HTML canvases after they have been redrawn to accommodate the new message (see reference to FIGS. 5A and 5B for a discussion of how a canvas is redrawn to keep messages and graphic inputs aligned). The server then saves the message to database 801 along with an updated copy of both canvases. Each time the user finishes entering a graphic input and the exemplary application issues a stop path command as described above, it also sends an updated version of the sender's canvas to the server for storage in database 801. The canvas data is sent through the socket connection as base64 encoded data urls and saved in a NoSQL database as a String. In this way, the server maintains an updated copy of the conversation at all times so that when a second user enters a conversation session, the second user receives an updated copy of the conversation from the server. This method has the benefit of ensuring that a persistent copy of the data is maintained if a client device's connection fails or a client device turns off unexpectedly. To minimize the amount of data transmitted to the server, the exemplary application may determine when a drawing warrants updating the server. For example, the exemplary application may update the server only when a graphic input consisting of more than five coordinate points is entered by the user. In addition, the server may employ caching to reduce the amount of data written to the database, especially when users are actively modifying the conversation.

As stated above, the server transmits an updated copy of conversation data to a client device when a user enters a conversation session. Depending on the user's connection speed and the size of the conversation data, the user may be required to wait for some amount of time before the conversation data is fully loaded and rendered on his communication device. To minimize the wait time, the exemplary application may preload data for the user. For example, when a client device receives a message from another user, the exemplary messaging application may anticipate the user's intention to open the conversation session associated with that message and download the conversation data from the server 800 before the user opens the conversation. On an iOS device, this might be done using the background data-fetch feature of the received push notification method called from within an app delegate class, as would be commonly understood by a person knowledgeable in the art. The prefetched data is then saved and injected into the webview directly from the client device memory when the user enters a messaging session. The exemplary messaging application might also prefetch the data based on whether the sending user has the conversation open when the receiving user receives a message. For example, if a sending user has the conversation open, such that he might likely modify the conversation data held on the server before the receiving user accesses the conversation, the exemplary application may choose not to prefetch the data. In another embodiment, the server may send a prefetch command to a receiving communication device when the user of a sending communication device leaves a conversation session. Especially when the sending user might be expected to send several messages to a receiving user before the receiving user opens the conversation session, this method helps ensure that the receiving device does not prefetch the conversation data several times before the receiving user opens the application to view the conversation. In another embodiment, the exemplary messaging application may prefetch the data associated with a user's most used conversations each time the user starts the application. For example, if a user opens the exemplary application to the list of contacts, the application may prefetch the first three conversations from the list in anticipation of the high likelihood that the user selects to view one of those conversations. It should be understand that a combination of the methods suggested here may be used and conversation data may be prefetched in other known methods.

In alternative embodiment, the conversation data held in database 801 is updated by the client-side application logic only when a user leaves a conversation session. If a second user access a conversation after a first user has altered the conversation but before the conversation data in database 801 has been updated with the first user's alterations, the server may retrieve the updated conversation data directly from the first user's device and transmit it to the second user. This method has the benefit of requiring less throughput to the server, but may result in an incomplete set of conversation data being present on the server if a client device fails to update the server after alterations are made. For example if a client device's network connection is unexpectedly lost or if the client device unexpectedly turns off, the client-side logic might fail to transmit an updated copy of the conversation data to the server. In addition, this method may have the unintended result of slowing the speed at which a conversation is rendered on a second user's device, because the second user must wait while the conversation data is sent from a first user to the server, and then sent from the server to the second user. If the first user has a slow network connection, delays could be longer.

In yet another embodiment, it is imaginable that the server 800 updates a copy of the conversation directly on the server each time a data packet for a graphic input is transmitted between users by using server-side canvas rendering framework such as node-canvas. This method has the benefit of decreasing network throughput by only transferring the entire conversation data when a user enters the conversation session, but has the disadvantage of increasing the amount of processing work performed by the server.

In yet another embodiment, the server 800 does not maintain a copy of the conversation data, but each client device independently updates and stores its own copy of the conversation locally. This method has the advantage of decreasing network throughput by eliminating the need to send the conversation data from the server when a user enters a conversation session, and removes the amount of conversation data stored on the server. However, this method increases the likelihood that a conversation would not be displayed identically on two devices, thereby creating the potential for confusion between users. For example, confusion may arise if one user circles a message on his screen using a graphic input when the message is not displayed in the same place or at all on a recipient's screen.

The server may determine if an entered graphic input is of suitable quality to alert a receiving user that it was received using a variety of factors, such as the size of a received graphic input, the duration of its entry, or what steps the sending user took before or after entering the graphic input. If the server determines that a graphic input is not of suitable quality to alert a receiving user, the server may not send the graphic input to the recipient communications device This method may prevent alerting a user that a graphic input was received when a sender inadvertently entered a graphic input, such as by bumping the screen with a finger. It is also imaginable that the client-side application would employ application logic to determine if an entered graphic input is of suitable quality to send to the server. To prevent sending a receiving user multiple alerts when a sending user enters a plurality of graphic inputs, the exemplary application alerts the receiving user only one time after the first graphic input or element is sent. If the sending user leaves and reenters the conversation session, the exemplary application will again alert the receiver only once after the first graphic input or element is sent. This method prevents a receiving user, for example, from receiving seven alerts if a user enters a graphic input as illustrated by the graphic input 206 in FIG. 2B, the word "Yay" underlined, composed of seven graphic elements.

As more bandwidth may be needed to send real-time graphic inputs than non-real-time graphic inputs or messages, such as text messages or pictures messages, a system of tiered bandwidth may provide limited bandwidth if a user sends a message to another user whose messaging application is not presently in use, moderate bandwidth if two users are actively using the messaging application, but neither is entering graphic inputs, or high bandwidth if either user enters graphic inputs while another user's messaging application is active. The exemplary messaging application may use probabilistic calculations to anticipate when a user may change bandwidth levels, allowing connection needs to be preemptively established. Such calculations may be based on a variety of factors, such as user input history, present user state, system-wide data, etc. The messaging application may even be enabled to inform the user about the quality of the communication connection and whether the receiving user is receiving graphic inputs in real-time, or if bandwidth constraints necessitate disabling real-time features when sending graphic inputs.

While only two client-side communication devices are shown, a plurality of client-side communication devices may communicate with each other. It is also imaginable that a single user, such as a person or computer device, may be associated with several devices, and when the user enters messages or graphic inputs on one device, those messages or graphic inputs are transmitted to the user's other device(s). If the user is a computer device, it may employ software logic to interact with the exemplary application, including interactions with the server and other communication devices.

In an alternative network embodiment, the logic in 802 that controls how the conversation is rendered to keep messages and graphic inputs alighted is housed on a client-side communication device using native programming methods similar to those described with reference to FIG. 5. In such an embodiment, the server is primarily responsible for establishing a connection between the two devices and delivering data content with a potentially limited interaction with the data. In another embodiment, client-side logic performs the functions of both the logic associated with webpage 802 and the application logic 803, such that client devices communicate with each other without the aid of a server, as might be imaginable using Bluetooth or other distributed or peer-to-peer network technologies. An application environment that is a mix of the methods mentioned above is also imaginable.

In yet another embodiment, graphic inputs and messages are transmitted over different networks. For example, graphic input data could be delivered over the internet, while messages are delivered using SMS- or MMS-data formats, PSTN networks, or other cellular networks, as would be commonly understood by a person knowledgeable in the art. It is also imaginable that the graphic input data could be delivered through SMS or MMS data formats. For example, the data associated with a plurality of coordinate points that collectively comprise one or more graphic inputs could be transmitted simultaneously as a stringified literal using MMS messaging.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method of communicating between first and second user devices, comprising:
   receiving input of a first graphic from the first user device, having a first display window with first horizontal and vertical dimensions, while at least one message, represented by message data in a first layer, is displayed in a single scrollable environment in the first display window of the first user device;
   transmitting, from the first user device toward the second user device, first graphic data, representing the first graphic, in a second layer stacked with the first layer containing the message data representing the at least one message;
   displaying the at least one message at the second user device in another scrollable environment defined by at least one of second horizontal and vertical dimensions of a second display window of the second user device; and
   displaying, in the second display window, the first graphic, input at the first user device, at a position defined by the first graphic data in the second layer stacked with the first layer containing the message data representing the at least one message, in the other scrollable environment of the second user device, regardless of any differences in the first and second horizontal and vertical dimensions.

2. The method as claimed in claim 1, further comprising:
   receiving input of a second graphic in association with the at least one message displayed at the second user device;
   transmitting, from the second user device toward the first user device, second graphic data, representing the second graphic, in a third layer stacked with the first and second layers; and
   displaying the first and second graphics at positions defined by the first and second graphic data in the second and third layers and in relationship to display of the at least one message in the single scrollable environment of the first user device, as defined by the first layer stacked with the second and third layers.

3. The method as claimed in claim 1, further comprising indicating at the second user device a direction to scroll to view the first graphic after said transmitting is completed and before said displaying.

4. The method as claimed in claim 1, further comprising storing the first graphic data and the at least one message and the association therebetween in a memory of the first user device as part of a conversation between the first and second user devices.

5. The method as claimed in claim 1, wherein said receiving limits input of the first graphic to a predefined number of messages.

6. The method as claimed in claim 1, wherein said receiving limits input of the first graphic to a predefined period of time during which the at least one message was input.

7. The method as claimed in claim 1, wherein said receiving limits input of the first graphic to a predefined display area in the single scrollable environment.

8. The method as claimed in claim 1, wherein said transmitting sends the first graphic data from the first user device toward the second user device during said receiving.

9. The method as claimed in claim 1, wherein said transmitting sends the first graphic data from the first user device toward the second user device after completion of said receiving.

10. The method as claimed in claim 1, further comprising limiting graphic input at the second user device based on control data received from the first user device.

11. The method as claimed in claim 1, further comprising modifying spacing at least one of before and after the at least one message.

12. The method as claimed in claim 1, further comprising outputting an alert at the second user device based on the first graphic data received from the first user device and predefined criteria.

13. The method as claimed in claim 1, further comprising
   receiving a request to redisplay at the second user device; and
   redisplaying the first graphic at the second user device in response to the request.

14. The method as claimed in claim 1, further comprising:
   producing a revised message by interpreting at least some of the first graphic data by both the first and second user devices as editing of the at least one message;
   displaying the revised message at a position associated with the at least one message in the other scrollable environment at the second user device.

15. The method as claimed in claim 14, further comprising displaying the revised message at the position associated with the at least one message in the single scrollable environment at the first user device.

16. The method as claimed in claim 1,
   further comprising displaying the at least one message in the first display window on a touchscreen of the first user device, and
   wherein said receiving of the first graphic is performed via the touchscreen of the first user device.

17. The method as claimed in claim 1, wherein said displaying the at least one message includes displaying multiple messages, each message having a defined space, within the single scrollable environment, separate from all of the other multiple messages.

18. The method as claimed in claim 17,
wherein said transmitting includes transmitting, with the first graphic data, identification of only one message previously transmitted between the first and second user devices, and
wherein, after said transmitting is completed, said displaying displays the first graphic in the defined space of the one message within the other scrollable environment at the second user device.

19. A method of communicating between first and second user devices, comprising:
receiving input of a first graphic in association with at least one message displayed on the first user device each message having a respectively separate defined space within a single scrollable environment;
transmitting first graphic data representing the first graphic and identification of only one message previously transmitted between the first and second user devices, from the first user device toward the second user device; and
displaying, after said transmitting is completed, the first graphic in the respectively separate defined space of the one message identified, within the single scrollable environment at the first user device and within another single scrollable environment at the second user device.

20. The method as claimed in claim 19, wherein said receiving, said transmitting and said displaying are performed concurrently, whereby the first graphic is displayed partially formed in the defined space of the one message within the other scrollable environment at the second user device before said transmitting is completed and completely formed after said transmitting is completed.

21. The method as claimed in claim 19, further comprising displaying, prior to said receiving the input of the first graphic, at least two messages, each message having the respectively separate defined space within the single scrollable environment.

22. A user device communicating with another user device, comprising:
a system memory storing instructions and data;
a display device displaying, in a single scrollable environment, at least a first message represented by first message data in a first layer;
a hardware processor, connected to said system memory, executing the instructions, including receiving input of a first graphic, represented by first graphic data in a second layer stacked with the first layer containing the first message data;
a transmitter, connected to at least one of said system memory and said hardware processor, transmitting the first graphic data to the other user device;
a receiver receiving, from the other user device, second graphic data representing a second graphic in a third layer stacked with the first and second layers, and at least a second message represented by second message data in the first layer; and
a display memory, connected to said hardware processor and said display device, storing at least the first and second message data representing the first and second messages, respectively, and the first and second graphic data representing the first and second graphics, respectively, said display device, displaying the second graphic, input at the other user device, at a position defined by the second graphic data in the third layer stacked with the first layer containing the second message data representing the second message in the single scrollable environment, at least one of the display memory and the display device defining horizontal and vertical dimensions of a display window on the display device, regardless of any differences between the first horizontal and vertical dimensions of the user device and second horizontal and vertical dimensions of another display window of the other user device.

23. The user device as claimed in claim 22,
wherein said display device displays each of the at least first and second messages in a defined space within the single scrollable environment,
wherein said receiver receives the second graphic data in association with only the second message previously transmitted between the user device and the other user device and identification of the second message, whereby, after the second graphic data has been received, said display device displays the second graphic in the defined space of the second message within the single scrollable environment.

24. The user device as claimed in claim 22,
wherein said hardware processor generates display data and stores the display data in the display memory, based on message data defining messages as previously displayed prior to receipt of the second graphic data by said receiver, and
wherein said display device displays the display data stored in the display memory, including the second graphic at the position associated with at least the second message.

25. The user device as claimed in claim 22,
wherein when said receiver receives a new message from the other user device, the new message is displayed in the single scrollable environment adjacent an immediately previously received message, and
wherein said hardware processor repositions the first and second messages as necessary to maintain alignment between the first and second messages and the first and second graphics, when the new message is received.

26. The user device as claimed in claim 22,
wherein said display device includes a touchscreen displaying at least the first message in the display window, and
wherein said receiver receives the first graphic from the touchscreen.

27. The user device as claimed in claim 22, wherein said display displays multiple messages, each message having a defined space, within the single scrollable environment, separate from all of the other multiple messages.

28. The user device as claimed in claim 27,
wherein said receiver receives, with the second graphic data, identification of the second message previously transmitted between the user device and the other user device, and
wherein said display displays the second graphic in the defined space of the second message within the scrollable environment.

29. A system, comprising:
user devices, each including
a display device displaying, in a single scrollable environment, at least a first message represented by first message data in a first layer;
a hardware processor executing a messaging application receiving input of a first graphic, represented by first graphic data in a second layer stacked with the first layer containing at least the first message data, and transmitting first graphic data representing the first graphic;

a system memory, connected to said hardware processor, storing instructions and data of the messaging application;

a transmitter, connected to at least one of said system memory and said hardware processor, transmitting the first graphic data to another user device;

a receiver receiving, from the other user device, second graphic data representing a second graphic in a third layer stacked with the first and second layers, and at least a second message represented by second message data in the first layer;

a display memory, connected to said hardware processor and said display device, storing at least the first and second message data representing the first and second messages, respectively, and the first and second graphic data representing the first and second graphics, respectively, said display device, displaying the second graphic, input at the other user device, at a position defined by the second graphic data in the third layer stacked with the first layer containing the second message data representing the second message in the single scrollable environment, at least one of the display memory and the display device defining horizontal and vertical dimensions of a display window on the display device, regardless of any differences between the first horizontal and vertical dimensions of the user device and second horizontal and vertical dimensions of another display window of the other user device; and a communication network including at least one server forming a connection between at least the user device and the other user device and delivering the first and second graphic data and first and second message data therebetween.

30. The system as claimed in claim 29, wherein said display device displays each of the at least first and second messages in a defined space within the single scrollable environment, wherein said receiver receives the second graphic data in association with only the second message previously transmitted between the user device and the other user device and identification of the second message, whereby, after the second graphic data has been received, said display device displays the second graphic in the defined space of the second message within the single scrollable environment.

31. The system as claimed in claim 29, wherein said hardware processor generates display data and stores the display data in the display memory, based on message data defining messages as previously displayed prior to receipt of the second graphic data by said receiver, and wherein said display device displays the display data stored in the display memory, including the second graphic at the position associated with at least the second message.

32. The system as claimed in claim 29, wherein when said receiver receives a new message from the other user device, the new message is displayed in the scrollable environment adjacent to an immediately previously received message, and wherein said hardware processor repositions the first and second messages as necessary to maintain alignment between the first and second messages and the first and second graphics, when the new message is received.

33. The system as claimed in claim 29, wherein said display device includes a touchscreen displaying at least the first message in the display window, and wherein said receiver receives the first graphic from the touchscreen.

34. The system as claimed in claim 29, wherein said display displays multiple messages, each message having a defined space, within the single scrollable environment, separate from all of the other multiple messages.

35. The system as claimed in claim 34, wherein said receiver receives, with the second graphic data, identification of the second message previously transmitted between the user device and the other user device, and wherein said display displays the second graphic in the defined space of the second message within the scrollable environment.

* * * * *